(12) United States Patent
Park et al.

(10) Patent No.: US 11,140,300 B2
(45) Date of Patent: Oct. 5, 2021

(54) CAMERA MODULE AND CAMERA MODULE MANUFACTURING METHOD

(71) Applicant: LG INNOTEK CO., LTD., Seoul (KR)

(72) Inventors: Je Kyung Park, Seoul (KR); Da Hin Moon, Seoul (KR); Jong Won Jeon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/339,666

(22) PCT Filed: Sep. 29, 2017

(86) PCT No.: PCT/KR2017/010908
§ 371 (c)(1),
(2) Date: Apr. 4, 2019

(87) PCT Pub. No.: WO2018/066911
PCT Pub. Date: Apr. 12, 2018

(65) Prior Publication Data
US 2020/0053258 A1    Feb. 13, 2020

(30) Foreign Application Priority Data

Oct. 6, 2016   (KR) .................. 10-2016-0128891
Oct. 6, 2016   (KR) .................. 10-2016-0128892

(51) Int. Cl.
*H04N 5/225*    (2006.01)
*G03B 17/08*    (2021.01)

(52) U.S. Cl.
CPC ........... *H04N 5/2252* (2013.01); *G03B 17/08* (2013.01); *H04N 5/2257* (2013.01)

(58) Field of Classification Search
CPC .......... H02K 41/035; G02B 27/64; G02B 7/09
(Continued)

(56) References Cited

U.S. PATENT DOCUMENTS 7,773,876 B2 *   8/2010   Westerweck ........... G03B 17/02
                                                      396/535
2009/0153985 A1 *   6/2009   Nagaoka ................ G02B 7/021
                                                      359/733

(Continued)

FOREIGN PATENT DOCUMENTS

CN       105278206 A     1/2016
JP       2003-324635 A   11/2003
(Continued)

*Primary Examiner* — Farhan Mahmud
(74) *Attorney, Agent, or Firm* — Birch, Stewart, Kolasch & Birch, LLP

(57) ABSTRACT

The present embodiment provides a camera module comprising: a lens barrel containing at least one lens; a front body which contains the lens barrel, and which comprises a flange portion formed to extend from a side surface thereof in a direction perpendicular to an optical axis; a substrate portion spaced from the lens barrel in the optical axis direction and arranged behind the front body; a rear body coupled to the flange portion so as to contain the substrate portion; a thermal bonding portion arranged between the flange portion and the rear body such that the front body and the rear body are coupled; and a gasket spaced from the thermal bonding portion and arranged between the front body and the rear body so as to contact the front body and the rear body, wherein the front surface of the flange portion, which is positioned to correspond to the thermal bonding portion, comprises a planar surface.

19 Claims, 16 Drawing Sheets

(58) Field of Classification Search
USPC .................................................. 348/143–160
See application file for complete search history.

(56) References Cited

U.S. PATENT DOCUMENTS

| | | |
|---|---|---|
| 2011/0199485 A1 | 8/2011 | Nakamura |
| 2011/0298925 A1* | 12/2011 | Inoue ................. H04N 5/22521 348/148 |
| 2014/0002676 A1 | 1/2014 | Ning |
| 2015/0205186 A1 | 7/2015 | Park et al. |
| 2020/0021181 A1* | 1/2020 | Park ........................ G02B 7/09 |

FOREIGN PATENT DOCUMENTS

| | | |
|---|---|---|
| JP | 2010-50771 A | 3/2010 |
| JP | 2011-164461 A | 8/2011 |
| KR | 10-2013-0056435 A | 5/2013 |
| KR | 10-2014-0110293 A | 9/2014 |
| KR | 10-2015-0104786 A | 9/2015 |
| KR | 10-2015-0112403 A | 10/2015 |
| KR | 1-2016-0104316 A | 9/2016 |

\* cited by examiner

CAMERA MODULE AND CAMERA MODULE MANUFACTURING METHOD

CROSS REFERENCE TO RELATED APPLICATIONS

This application is the National Phase of PCT International Application No. PCT/KR2017/010908, filed on Sep. 29, 2017, which claims priority under 35 U.S.C. 119(a) to Patent Application Nos. 10-2016-0128891, filed in the Republic of Korea on Oct. 6, 2016 and 10-2016-0128892, filed in the Republic of Korea on Oct. 6, 2016, all of which are hereby expressly incorporated by reference into the present application.

TECHNICAL FIELD

The present embodiment relates to a camera module and camera module manufacturing method.

BACKGROUND ART

The following description provides background information for the present exemplary embodiment and does not describe the prior art.

Camera modules that photograph a subject as a photo or movie can be combined with various devices and apparatuses. Particularly, due to the advancement and automation of vehicle parts, automobiles in which camera modules are combined are introduced to the market. The camera modules are used in the automobiles as being installed inside the front and rear surveillance cameras, a black box and the like.

Since most of these camera modules protrude outside the automobiles, durability and waterproofness (airtightness) must be secured. Furthermore, heat dissipation property must be secured to prevent damage caused by deterioration.

The housing of the camera module for a vehicle generally has a combined form of a front body wherein a lens barrel is located and a rear body wherein electronic parts such as a substrate portion, that is a printed circuit board (PCB), and an image sensor are disposed. The housing of the camera module for a vehicle is made of metal or plastic. In the case of a metal material, since the price is high (about ten times that of plastic) and the cover and the body are screw-coupled, there is a problem in that a space for installing the printed circuit board is insufficient.

On the other hand, the plastic material has a low material cost, and since the front body and the rear body are thermally bonded together, it is advantageous in that a wide space for accommodating the parts can be secured. Therefore, recently research on a housing using a plastic material has been actively carried out. However, in the case of a plastic housing, there is a problem that condensation occurs in the thermal bonding portion of the cover and the body, and expensive electronic components are broken down due to internal moisture infiltration.

On the other hand, a camera module for a vehicle is manufactured by combining a front body on which a lens barrel is mounted and a rear body in which an electronic part (for example, a substrate unit) is accommodated. The front body and the rear body, which are external members, are generally formed of a metal material. Therefore, when combining the front body and the rear body, a screw coupling method is used. The screw coupling method requires a screw coupling space for fastening the screw to the front body and the rear body.

Therefore, there is a problem that the space for accommodating the substrate unit in the rear body is insufficient. Further, when a metal material is used, there is a problem that the material cost (about 10 times that of plastic) increases.

DISCLOSURE

Technical Problem

The first embodiment of the present invention is to provide a camera module capable of sufficiently securing an internal space in which electronic parts are accommodated and capable of protecting electronic parts by preventing moisture infiltration from the outside and dewing, and to provide a method of manufacturing method thereof.

The present second embodiment intends to provide a camera module that can maximally secure a space for accommodating electronic components therein and further ensure the airtightness of the internal space thereby providing a waterproof camera module.

Technical Solution

The present embodiment provides a camera module comprising: a lens barrel accommodating at least one lens; a front body accommodating the lens barrel, comprising a flange portion formed by extending from a side surface thereof in a direction perpendicular to an optical axis; a substrate portion spaced apart from the lens barrel along the optical axis direction and disposed at the rear side of the front body; a rear body combined to the flange portion, accommodating the substrate portion; a thermal bonding portion disposed between the flange portion and the rear body to combine the front body and the rear body; and a gasket spaced apart from the thermal bonding portion and disposed between the front body and the rear body and in contact with the front body and the rear body, wherein the front surface of the flange portion positioned corresponding to the thermal bonding portion comprises a planar surface.

A step having a lower end more inwardly recessed than the upper end is located in the flange portion, and the gasket can cover the lower end of the step.

The rear body is disposed with a gasket support portion protruding into the rear body, and the gasket can be pressed by the gasket support portion.

A thermal bonding groove for accommodating the thermal bonding portion may be disposed on the planar surface.

The thermal bonding portion is formed by laser welding, and the shortest distance between the surface of the gasket and a laser irradiating portion irradiated with a laser in the thermal bonding portion may be 2 mm or more.

The front body and the rear body may comprise a plastic material.

The front body and the rear body may comprise a plastic material mixed with carbon or metal.

The gasket is ring-shaped and may be made of a rubber material.

A method of manufacturing a camera module according to the first embodiment comprises the steps of: combining a front body and a gasket; accommodating a substrate portion in a rear body; aligning the front body and the rear body in close contact with each other; and thermal bonding of the front body and the rear body to manufacture a camera module, wherein the camera module comprising: a lens barrel accommodating at least one lens; a front body accommodating the lens barrel, comprising a flange portion formed by extending from a side surface thereof in a direction perpendicular to an optical axis; a substrate portion spaced apart from the lens barrel along the optical axis direction and disposed at the rear side of the front body; a rear body combined to the flange portion, accommodating the substrate portion; a thermal bonding portion disposed between the flange portion and the rear body to combine the front body and the rear body; and a gasket spaced apart from the thermal bonding portion and disposed between the front body and the rear body and in contact with the front body and the rear body, wherein the front surface of the flange portion positioned corresponding to the thermal bonding portion comprises a planar surface.

A camera module of the second embodiment comprises: a lens barrel accommodating at least one lens; a front body to which the lens barrel is coupled; a rear body having a front opening and an inner space formed by a rear surface and a sidewall portion extending forward from the rear surface, and combined with the front body so as to close the front opening by the front body; a substrate unit accommodated in an inner space of the rear body; and a gasket, with the front surface thereof in contact with the a rear surface of the front body, with the rear surface thereof in contact with the front surface of the sidewall portion of the rear body, and interposed between the front body and the rear body, wherein the rear body comprises a first rib extending forward at a portion of a front surface of the sidewall portion and the front body comprises a first rib groove wherein a first rib is accommodated in a rear surface, and the front body and the rear body can be combined by thermal bonding of the first rib and the first rib groove.

A front portion of the first rib is accommodated in the first rib groove and thermally bonded thereto, and an inner side surface of the rear portion of the first rib can be in contact with an outer side surface of the gasket.

The sidewall portion comprises a first sidewall and a second sidewall; and a first corner sidewall connecting the first sidewall and the second sidewall, wherein the first rib extends forward at the first corner sidewall and may be curved along the first corner sidewall.

The gasket comprises a first side and a second side; an outer side surface of the first corner portion is curved corresponding to the first rib so as to be in contact with an inner side surface of a rear portion of the first rib; and the first side and the outer side surface of the second side may be exposed towards the outside.

One side of the first gasket corner portion of the first corner portion is connected to a first connecting portion extending inwardly from the first side, and the other side of the first gasket corner portion may be connected to a second connecting portion extending inwardly from the second side.

The first connecting portion and the second connecting portion may be curved inwardly.

The material of the front body and the rear body may comprise plastics.

The material of the front body and the rear body may comprise plastics mixed with carbon or metal.

A laser may be irradiated on the front surface of the rib so that the rib and the rib groove are thermally bonded.

The shortest distance between the gasket and the portion irradiated with the laser on the front surface of the rib may be 2 mm or more.

The substrate unit may comprise at least one substrate; a shield can accommodating the substrate; and an image sensor mounted on the substrate in alignment with an optical axis direction of the lens barrel.

Advantageous Effects

According to the first embodiment, since the front body and the rear body made of plastics are combined by thermal bonding, the internal space can be wide enough to accommodate sufficient electronic parts. Furthermore, since a gasket interposed and compressed between the front body and the rear body is further included, it is possible to prevent moisture infiltration and dewing. Further, since a safety distance is secured between the surface of the gasket and the thermal bonding portion, it is possible to prevent the gasket from being damaged by deterioration upon thermal bonding.

According to the second embodiment, since the rear body and the front body are combined by thermal bonding, an additional space for screw-coupling is not required. In addition, since the partial thermal bonding is applied, the inner space of the rear body can be maximally secured. Furthermore, the airtightness is secured by the arrangement structure of the gasket, thereby enhancing the waterproof property.

BEST MODE

Figure 1:
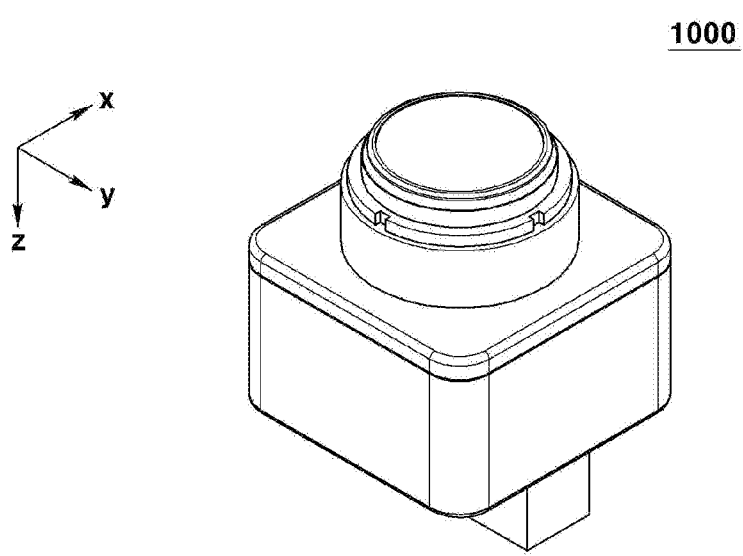
FIG. 1 is a perspective view showing a camera module of a first embodiment.

Hereinafter, some embodiments of the present invention will be described with reference to exemplary drawings. In describing the reference symbols of the components in the drawings, the same components are denoted by the same reference numerals whenever possible, even if they are shown on other drawings. In the following description of the embodiments of the present invention, a detailed description of known functions and configurations incorporated herein will be omitted when it may hinder the understanding of the embodiments of the present invention.

In describing the components of the embodiment of the present invention, terms such as first, second, A, B, (a), and (b) may be used. These terms are merely intended to distinguish the components from other components, and the terms do not limit the nature, order or sequence of the components. When a component is described as being "connected," "coupled," or "jointed" to another component, the component may be directly connected, coupled, or jointed to the other component, however, it should be understood that another element may be "connected," "coupled" or "jointed" between components.

Hereinafter, the "up-down direction" is defined as the X-axis direction shown in the drawing. In this case, the "upper direction" is the arrow direction of the X-axis. The "left-to-right direction" is defined as the Y-axis direction shown in the drawing. In this case, the "left side" is the arrow direction of the Y-axis. Also, the "front-to-rear direction" is defined as the Z-axis direction shown in the drawing. In this case, the "rear direction" is the arrow direction of the Z axis. Also, the "optical axis direction" is defined as the optical axis direction of the lens barrel 100. On the other hand, the "optical axis direction" can be mixedly used in combination with the "front-to-rear direction," Z-axis direction, and the like.

Figure 2:
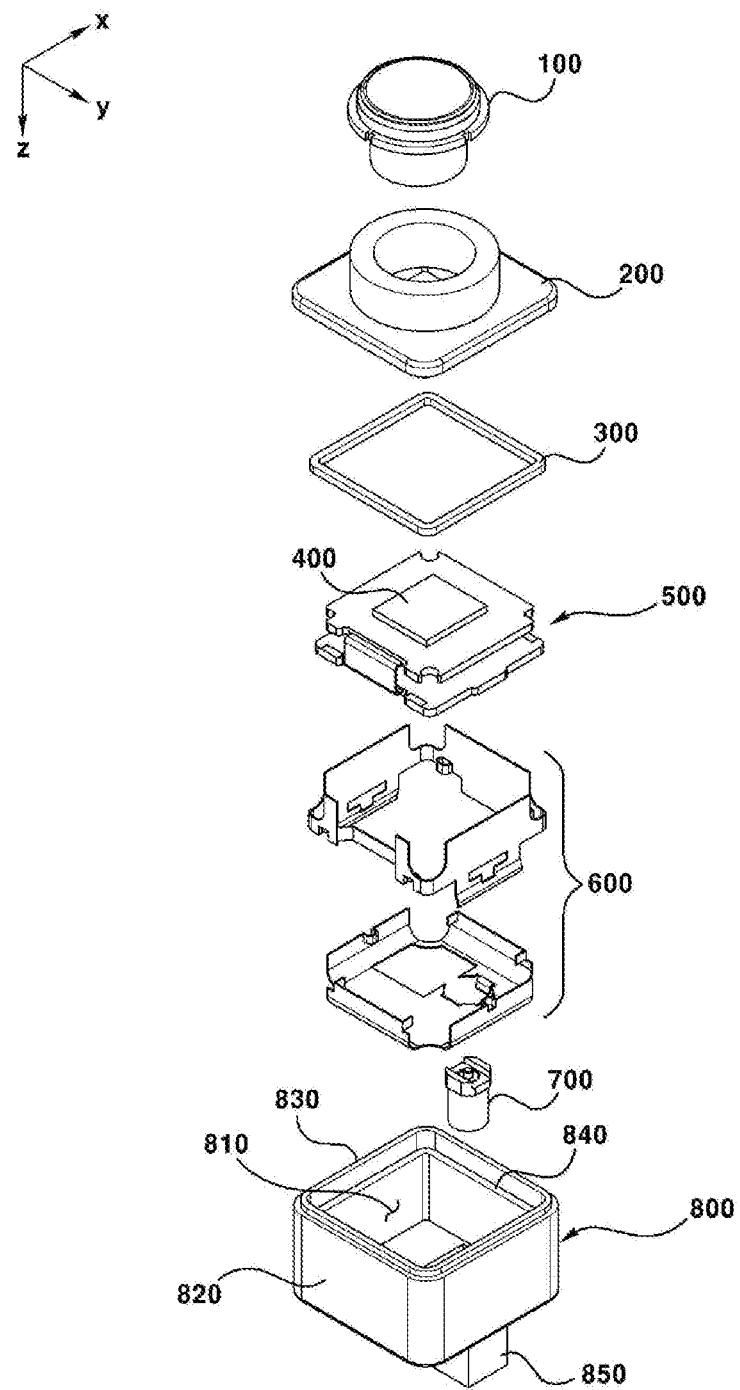
FIG. 2 is an exploded perspective view showing the camera module of the first embodiment.
Figure 3:
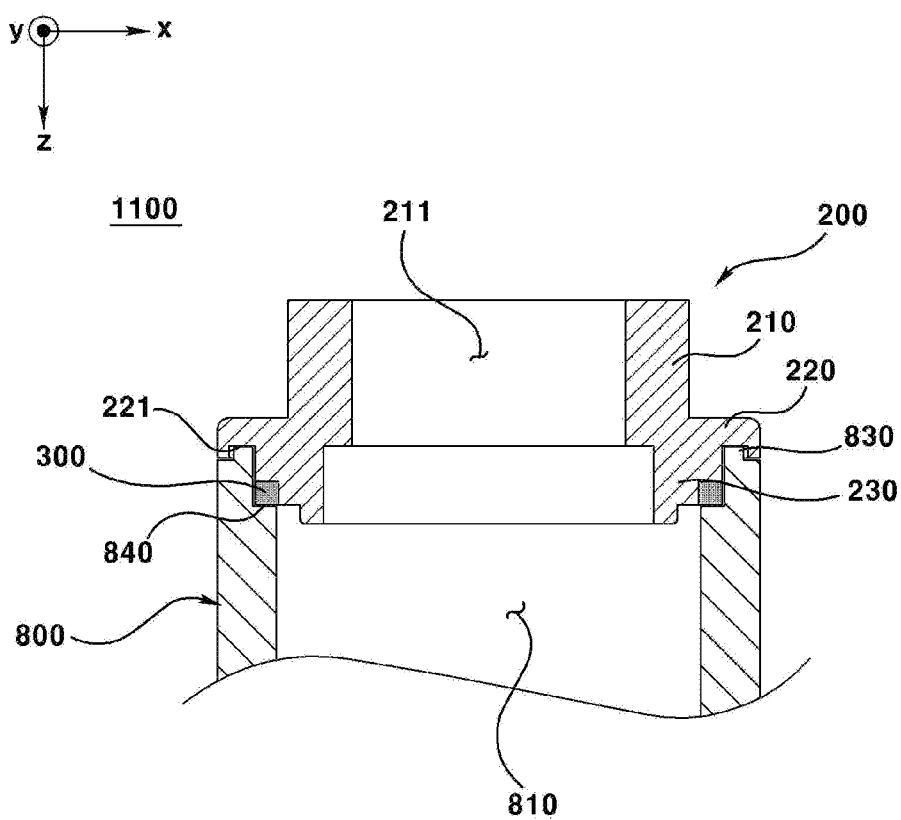
FIG. 3 is a vertical cross-sectional view showing a camera housing of the first embodiment.
Figure 4:
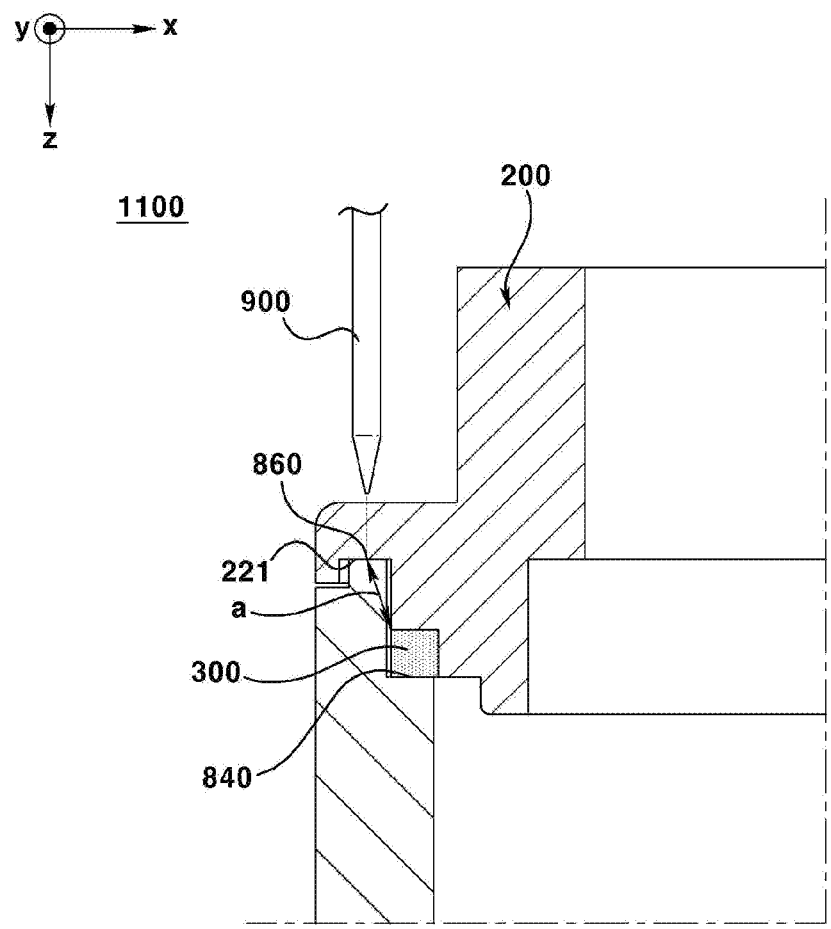
FIG. 4 is a vertical cross-sectional view showing the thermal bonding process of the camera housing of the first embodiment.
Figure 5:
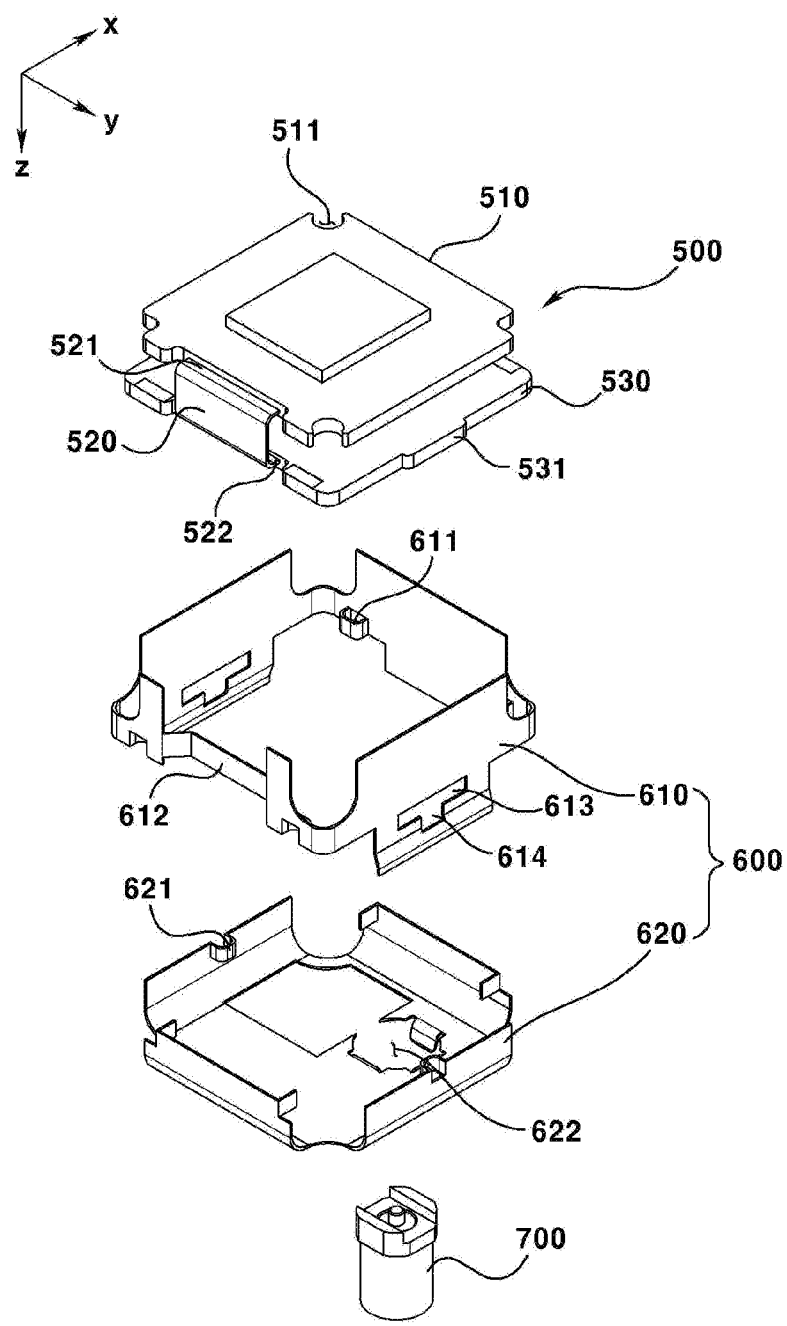
FIG. 5 is an exploded perspective view showing a substrate portion, a shield can, and a connector of the first embodiment.

Hereinafter, a camera module 1000 and a camera housing 1100 of the first embodiment will be described with reference to the drawings. FIG. 1 is a perspective view showing the camera module 1000 of the first embodiment; FIG. 2 is an exploded perspective view showing the camera module 1000 of the first embodiment; FIG. 3 is a vertical cross-sectional view showing the camera housing 1100 of the first embodiment; FIG. 4 is a vertical cross-sectional view showing the laser thermal bonding process of the camera housing 1100 of the first embodiment; and FIG. 5 is an exploded perspective view showing a substrate portion 500, a shield can 600, and a connector 700 of the first embodiment.

A camera module 1000 according to the first embodiment may comprise a lens barrel 100, a front body 200, a gasket 300, an image sensor 400, a substrate portion 500, a shield can 600, a connector 700, and a rear body 800. The camera housing 1100 according to the present invention may comprise a front body 200, a gasket 300, and a rear body 800.

The lens barrel 100 may be positioned on the front body 200 which will be described later. The lens barrel 100 may be located in a lens barrel accommodating portion 210 of the front body 200. The lens barrel 100 may be positioned in a lens barrel hole 211 of the lens barrel receiving portion 210. The lens barrel 100 can be accommodated in the lens barrel hole 211 of the lens barrel accommodating portion 210. The lens barrel 100 may be screw-coupled or bonded to the lens barrel accommodating portion 210. At least one lens can be accommodated in the lens barrel 100. Therefore, the lens barrel 100 may have an optical axis. The light passing through the lens barrel 100 can be irradiated to the image sensor 400 described later.

The front body 200 may be a component of the camera housing 1100 as an exterior material. The front body 200 may be positioned above the rear body 800, which will be described later. The front body 200 may cover an opening 810 of the rear body 800. The front body 200 may comprise a plastic material. The front body 200 may comprise a plastic material mixed with carbon or metal. The front body 200 may comprise a laser-transmissible plastic material or a plastic material mixed with laser-transmissible carbon or metal. Adding carbon or metal to plastics can improve heat dissipation, durability, and electromagnetic shielding. However, if the ratio of carbon or metal is too high, the thermal bonding may not be performed well and therefore the ratio of plastic to carbon or metal should be properly trade-off. The front body 200 and the rear body 800 can be combined together by thermal bonding. In this case, thermal bonding can be achieved by laser welding under pressure.

The lens barrel 100 may be positioned in the front body 200. The gasket 300 may be positioned in the front body 200. The front body 200 may comprise a lens barrel accommodating portion 210, a planar surface 220, and a flange portion 230. The lens barrel accommodating portion 210, the planar surface 220, and the flange portion 230 may be integrally formed.

The lens barrel accommodating portion 210 may be provided with a lens barrel hole 211. The lens barrel accommodating portion 210 may have a hollow cylindrical shape, and a lens barrel hole 211 may be formed at the center thereof. The lens barrel 100 can be positioned and fixed to the lens barrel hole 211. A planar surface 220 may be positioned at the rear portion of the lens barrel accommodating portion 210. The lens barrel accommodating portion 210 and the planar surface 220 may be integrally formed of plastics or a plastic injection molded material mixed with carbon or metal.

The planar surface 220 may be located at the rear end of the lens barrel accommodating portion 210. The planar surface 220 may be disposed at a position corresponding to a thermal bonding portion 830, which will be described later. The planar surface 220 may have a square plate shape and the lens barrel hole 211 extending from the lens barrel accommodating portion 210 may be formed at the center. That is, the lens barrel hole 211 can penetrate the lens barrel accommodating portion 210 and the planar surface 220. The planar surface 220 may be located in front of the rear body 800 which will be described later. In this case, the planar surface 220 can cover the rear body 800 and block the opening 810 of the rear body 800. In this case, the inner space of the rear body 800 can communicate with the lens barrel hole 211 through the opening 810. However, the shape of the planar surface 220 is not limited to the plate shape described above. That is, as for the form of the planar surface 220, any form can be applied as long as it covers the rear body 800 and can communicate with the lens barrel hole 211. Thus, the planar surface 220 may be referred to as a "cover member."

The planar surface 220 may comprise a thermal bonding groove 221. The thermal bonding groove 221 may be formed along the outer circumference of the rear surface of the planar surface 220. The thermal bonding groove 221 may be a portion in contact with a thermal bonding portion 830 of the rear body 800, which will be described later. Therefore, the shape of the thermal bonding groove 221 may be the same as or similar to the thermal bonding portion 830. The thermal bonding portion 830 can be accommodated in the thermal bonding groove 221. The inner side surface of the thermal bonding groove 221 and the outer side surface of the thermal bonding portion 830 can be in contact with each other. In this state, the front body 200 and the rear body 800 can be combined by laser welding, which will be described later.

The flange portion 230 may be located below the planar surface 220. The flange portion 230 may be hollow and may have a shape of a tetrahedron with a low height and may have a lens barrel hole 211 penetrating the center thereof. That is, the lens barrel hole 211 can sequentially pass through the lens barrel accommodating portion 210, the planar surface 220, and the flange portion 230. That is, the lens barrel hole 211 may be formed in the form of a core in the front body 200. In this case, the inner space of the rear body 800 can communicate with the lens barrel hole 211 through the opening 810. The flange portion 230 may comprise a step. The flange portion 230 may have a step having a lower end (rear end) more inwardly recessed than the upper end (front end).

The flange portion 230 may be insertingly coupled to the gasket 300. In this case, the flange portion 230 can penetrate the ring-shaped gasket 300 and the gasket 300 can be positioned along the side surface of the flange portion 230. Further, the gasket 300 may be positioned at the rear end of the step of the flange portion 230. In this case, the gasket 300 may be located along the side circumference of the rear end of the step of the flange portion 230. That is, the gasket 300 may cover the rear end of the step of the flange portion 230. Further, the upper surface of the gasket 300 can be in contact with the lower surface of the front end.

The gasket 300 may be a component of the camera housing 1100. The gasket 300 may be an elastic material. The gasket 300 may be made of a rubber material. The gasket 300 can be insertingly coupled to the flange portion 230 in a rectangular ring shape. In this case, the flange portion 230 can penetrate the gasket 300. Further, the gasket 300 may be located at the rear end of the step of the flange portion 230. In this case, the front surface of the gasket 300 can be in contact with the rear surface of the front end of the step of the flange portion 230. The gasket 300 may be inserted into the inner space of the rear body 800 when the front cover 200 and the rear body 800 are combined. In this case, the rear surface of the gasket 300 may be supported by being in contact with the gasket support portion 840 of the front body 800, which will be described later.

The front surface of the gasket 300 after the front body 200 and the rear body 800 are combined is in contact with the rear surface of the front end of the step of the flange portion 230 and the rear surface of the gasket 300 is supported by the gasket support portion 840, and the outer side surface of the gasket 300 is in contact with the inner side surface of the body 800, and the inner side surface of the gasket 300 is in contact with the outer side surface of the rear end of the step of the flange 230. Accordingly, the gasket 300 can seal the rear body 800. Further, the front cover 200 and the rear body 800 are combined with each other in the front-to-rear direction, so that the gasket 300 can be pressed especially by the combining pressure of the gasket support portion 840 and the front end of the step of the flange portion 230. As a result, the sealing performance of the gasket 300 can be enhanced.

The image sensor 400 may be accommodated in the inner space of the rear body 800. The image sensor 400 may be mounted on the substrate portion 500 which will be described later. The image sensor 400 may be positioned on the front surface of a first substrate 510 located in the front portion of the substrate portion 500. The image sensor 400 may be positioned so that its optical axis is aligned with the lens barrel 100. Thus, the image sensor 400 can acquire the light that has passed through the lens barrel 100. In this case, the image sensor 400 can output the irradiated light as an image. The image sensor 400 may be a charge coupled device (CCD), metal oxide semiconductor (MOS), CPD, and CID. However, the type of the image sensor 400 is not limited thereto.

The substrate portion 500 can be accommodated in the inner space of the rear body 800. The substrate portion 500 may be positioned in the inner space of the rear body 800 by screw-coupling the front body 200 or the rear body 800 together. The substrate portion 500 may be positioned in the inner space of the rear body 800 by being adhered to the front body 200 or the rear body 800. The substrate portion 500 can be placed in the inner space of the rear body 800 by covering the shield can 600 which will be described later. The image sensor 400 may be mounted on the front end of the substrate portion 500. The connector 700 can be mounted on the rear end of the substrate portion 500. The substrate portion 500 comprises a first substrate 510, a third substrate 530, and a second substrate 520 interconnecting the first substrate 510 and the third substrate 530.

The first substrate 510 may be spaced apart from the third substrate 530 and may be located at the forefront portion of the substrate portion 500. The first substrate 510 may be connected to the third substrate 530 by the second substrate 520. The image sensor 400 may be mounted on the upper surface of the first substrate 510. The first substrate 510 may be covered by a shield can 600. In this case, the four sides of the first substrate 510 can contact the inner side surface of the shield can 600. The first substrate 510 can be supported by a first substrate support 611 of a side can 610 which will be described later. The upper portion of the first substrate 510 may be supported by being in contact with the first substrate support portion 611. The first substrate 510 may be fixed to the rear portion of the front body 200 by screw-coupling. The first substrate 510 may be supported by being adhered to the rear portion of the front body 200. The image sensor 400 may be mounted on the front surface of the first substrate 510. At least a portion of the corners of the first substrate 510 may be formed with a screw groove 511 cut-off in the form of an arc or a circle. The screw (not shown) may penetrating through the screw groove 511 so as to fix the first substrate 510 to the rear portion of the front body 200. The first substrate 510 can be fixed to the front body 200 by the combining pressure of the screw. The first substrate 510 may be a printed circuit board (PCB) in the form of a square plate. The first substrate 510 may electronically control the camera module 1000. A ground terminal (not shown) may be positioned on at least a portion of four sides of the first substrate 510. As a result, the remaining electromagnetic force of the first substrate 510 can escape to the outside through the shield can 600.

The second substrate 520 may be positioned between the first substrate 510 and the third substrate 530 to interconnect the first substrate 510 and the third substrate 530. In order to electronically control the camera module 1000, a substrate having a predetermined area or more is required, however, the cross-section of the inner space of the rear body 800 is smaller than that due to the design requirements of a vehicle camera. Therefore, stacking of a plurality of substrates such as the first substrate 510 and the third substrate 530 of the present invention is common, and a connecting substrate such as a second substrate 520 is provided for electrical interconnection of the plurality of substrates. Meanwhile, since the front body 200 and the rear body 800 of the present invention are combined by laser welding, not by screw-combining, an internal space wherein the substrate portion 500 is to be built can be maximally provided. The second substrate 520 may be a flexible printed circuit board (FPCB) in the form of a square plate erected in the front-to-rear direction. As a result, a curved first substrate connection portion 521 may be positioned on the front side of the second substrate 520, and a curved third substrate connection portion 522 may be positioned on the rear side of the second substrate 520. The first substrate connection portion 521 may be electrically connected to a side located below the first substrate 510. In this case, the terminal of the first substrate connection portion 521 and the terminal disposed on the lower side of the first substrate 510 may be electrically connected by soldering. The third substrate connection portion 522 may be electrically connected to a side located below the third substrate 530. In this case, the terminal of the third substrate connection portion 522 and the terminal disposed at the lower side of the third substrate 530 may be electrically connected by soldering. The second substrate 520 may be located outside (below) a second substrate holding portion 612 of the side can 610 which will be described later. Therefore, the internal movement of the second substrate 520 can be restricted by the second substrate holding portion 612.

The third substrate 530 may be spaced apart from the first substrate 510 and may be located at the rear end of the substrate portion 500. The third substrate 530 may be connected to the first substrate 510 through the second substrate 520. A connector 700 to be described later may be mounted on the lower surface of the third substrate 530. The third substrate 530 can be covered by the shield can 600. In this case, the four sides of the third substrate 530 can be in contact with the inner side surface of the shield can 600. The third substrate 530 can be fixed to the side can 610 by a third substrate protrusion 531 being inserted into a third substrate holding groove 613 of the side can 610 which will be described later. The third substrate protrusion 531 may be in the form of a protrusion extending outward from the right and left side surfaces of the first substrate 510. The third substrate protrusion 531 may be inserted into the third substrate locking hole 613 to apply a supporting force to the third substrate 530. The third substrate 530 may be a printed circuit board (PCB) in the form of a square plate. The third substrate 530 may electronically control the camera module 1000. A grounding end (not shown) may be positioned on at least a portion of the four sides of the third substrate 530. As a result, the residual electromagnetic force of the third substrate 530 can escape to the outside through the shield can 600.

The shield can 600 can be accommodated in the inner space of the rear body 800. In this case, the outer side surface of the shield can 600 can be in contact with the inner side surface of the rear body 800. The substrate portion 500 can be accommodated inside the shield can 600. The image sensor 400 mounted on the substrate portion 500 may be positioned at the top end portion of the shield can 600. The connector 700 penetrating the rear surface of the shield can 600 may be positioned at a rear portion of the shield can 600. The shield can 600 may be in the form of a block with an open front. As a result, the light transmitted through the lens barrel 100 can be irradiated to the image sensor 400. The shield can 600 may be formed of a metal material. More specifically, the shield can 600 may be formed of a metal plate. In this case, the shield can 600 may block electromagnetic interference (EMI). That is, the shield can 600 may prevent the electromagnetic waves generated from the outside from entering into the substrate portion 500. As described above, since the substrate portion 500 is grounded to the shield can 600, the remaining electromagnetic force remaining on the substrate portion 500 can escape to the outside through the shield can 600. As a result, the substrate portion 500 can be maintained in an electromagnetically stable state. However, the material of the shield can 600 is not limited thereto. The shield can 600 may comprise a side can 610 and a rear can 620. In this case, the side can 610 and the rear can 620 can be assembled. However, the side can 610 and the rear can 620 may be integrally formed (not shown).

The side can 610 may be accommodated in the inner space of the rear body 800. In this case, the outer side surface of the side can 610 may be in contact with the inner side surface of the rear body 800. The rear can 620 may be positioned at rear of the side can 610. The substrate portion 500 can be accommodated inside the side can 610. The side can 610 may be a hollow rectangular parallelepiped. The front and rear sides of the side can 610 may be open. As a result, the side can 610 may form the side surface of the shield can 600. The first substrate support portion 611 protruding inward can be positioned at the inner side of the upper side of the side can 610. The first substrate support portion 611 may support the first substrate 510 by being contacted with the upper portion of the rear surface of the first substrate 510. The second substrate holding portion 612 may be positioned on a surface portion of the side can 610 that is located under the second substrate holding portion 610. The second substrate holding portion 612 may have a smaller cross-sectional area than the other surface of the side can 610. That is, the second substrate holding portion 612 may be a flat bar. And the second substrate 520 may be positioned outside (lower direction) of the second substrate holding portion 612. As a result, when the second substrate 520 moves upward due to an external force at an unexpected time, it can be braked by being caught by the second substrate holding portion 612. A third substrate holding hole 613 and a rear can holding hole 614 may be formed on the left and right side surfaces of the side can 610. The shape of the third substrate holding hole 613 may correspond to the shape of the third substrate protrusion 531 described above. Therefore, the third substrate protrusion 531 can be inserted into the third substrate holding hole 613. As a result, the third substrate 530 can be fixed to the side can 610. The position of the third substrate holding hole 613 is lower than the position of the first substrate support portion 611 and may be located at the rear direction of the first substrate 510 and the third substrate 530. The shape of the rear can holding hole 614 may correspond to the shape of the rear can protrusion 621 which will be described later. Therefore, the rear can protrusion 621 can be inserted into the rear can holding hole 614. As a result, the rear can 620 may be assembled to the side can 610 and fixed to the rear of the side can 610. The third substrate holding hole 613 and the rear can holding hole 614 may be integrally formed.

The rear can 620 can be accommodated in the inner space of the rear body 800. In this case, the outer side surface of the rear can 620 may be in contact with the inner side surface of the rear body 800. The side can 610 may be positioned in front of the rear can 620. The connector 700 penetrating the rear surface of the rear can 620 may be positioned at the rear side of the rear can 620. A connector through hole 622 may be formed on the rear surface of the rear can 620, and the connector 700 may penetrate the rear surface of the rear can 620 through the connector through hole 622. The rear can 620 may have a flat plate and side surfaces extending forward from each of its four sides respectively. Therefore, the front portion and the front and rear edges of the rear can 620 may be open. the rear can protrusion 621 extending inwardly may be formed at the upper center of the left and right side surfaces of the rear can 620. The rear can protrusion 621 can be inserted into the rear can holding hole 614. Therefore, the side surface of the rear can 620 can be fixed to the side can 610 to cover the rear end portion of the side can 610. As a result, the rear can 620 may form the rear surface of the shield can 600.

The connector 700 can be accommodated in the inner space of the rear body 800. The connector 700 may be mounted on the base portion 500. The connector 700 may be mounted on the rear surface of the third substrate 530. The connector 700 may have a cylindrical shape and a terminal may be positioned on the front surface thereof. The terminal of the connector 700 may be soldered to the terminal formed on the rear surface of the third substrate 530 and combined thereto. The connector 700 can penetrate the rear can 620 through the connector through hole 622. The connector 700 penetrating through the rear can 620 may be accommodated in a connector accommodating portion 850 of the rear body 800 which will be described later. The connector 700 may be electrically connected to a cable (not shown). The cable may be a conductive line interconnecting an external electronic device and the camera module 1000. Accordingly, the image signal output from the camera module 1000 can be transmitted to the external electronic device through the cable. Accordingly, the image signal captured by the camera module 1000 may be stored by the external electronic device or displayed. In addition, the external electronic device may supply power to the camera module 1000 through the cable. In addition, the external electronic device can control the camera module 1000 by sending a control signal to the camera module 1000 through the cable.

The rear body 800 may be a component of the camera housing 1100 as an exterior material. The rear body 800 may be positioned at the rear side of the front body 200 which will be described later. The rear body 800 may be in the form of a hollow rectangular parallelepiped having an open front side defined by a sidewall 820 extending forward from the rear surface. The opening 810 of the rear body 800 can be covered by the front body 200. However, the lens barrel hole 211 of the front body 200 can communicate with the inner space of the rear body 800. The rear body 800 may comprise a plastic material. The rear body 800 may comprise a plastic material mixed with carbon or metal. The rear body 800 may comprise a laser absorbing plastic material or a plastic material mixed with laser absorbing carbon or metal. The rear body 800 and the front body 200 can be combined together by thermal bonding. In this case, thermal bonding can be achieved by laser welding under pressure.

The lower portion of the front body 200 can be accommodated in the inner space of the rear body 800. That is, a portion of the front body 200 can be inserted into the inner space of the rear body 800. In this case, the flange portion 230 of the front body 200 can be inserted. The inner side surface of the gasket 300 is in contact with the flange portion 230 and the outer side surface of the gasket 300 is in contact with the front inner side surface of the sidewall 820 of the rear body 800. As a result, the inner space of the rear body 800 can be sealed by the gasket 300.

A thermal bonding portion 830 protruding upward along the sidewall 820 may be located inside the front surface of the sidewall 820 of the rear body 800. The thermal bonding portion 830 may have a rectangular parallelepiped shape along the circumference of the sidewall 820. The thermal bonding portion 830 may have a shape corresponding to a thermal bonding groove 221. Therefore, the thermal bonding portion 830 can be accommodated in the thermal bonding groove 221 when the rear body 800 and the front body 200 are combined.

The rear body 800 may be provided with a gasket support portion 840 protruding into the rear body 800. The gasket support portion 840 protruding inward may be located on the sidewall 820 of the rear body 800. The gasket support portion 840 may be in the form of a step. The gasket support portion 840 may be in contact with the rear surface of the gasket 300 so as to support the gasket 300. The front surface of the gasket 300 is in contact with the rear surface of the front end of the step of the flange portion 230, and the rear surface of the gasket 300 is in contact with the front surface of the gasket support portion 840. As described above, the rear body 800 and the front body 200 can be combined under a pressurized state. As a result, the gasket 300 at the time of combining can be pressed by the gasket support portion 840 and the front end of the step of the flange portion 230. In this case, expansion pressure is generated in the gasket 300 in the up, down, left, and right directions by the front and rear pressing. Since the inner side surface of the gasket 300 is in contact with the flange portion 230 and the outer side surface of the gasket 300 is in contact with the inner side surface of the front portion of the sidewall 820, thereby enhancing the adhesion strength of the gasket 300. As a result, the sealing ability of the gasket 300 may be improved.

The connector accommodating portion 850 may be positioned on the rear surface of the rear body 800. The connector accommodating portion 850 may be in the form of a hollow rectangular parallelepiped extending rearward from the rear surface of the rear body 800. The connector 700 can be accommodated in the connector accommodating portion 850 and protected from external force.

A laser irradiation unit 860 may be positioned on the thermal bonding portion 830 of the rear body 800. As will be described later, the laser welder 900 may irradiate laser light from the front direction towards the rear direction. In this case, the laser light is transmitted through the planar surface 220 and irradiated to the thermal bonding portion 830. The laser irradiation unit 860 is a point at which the laser light transmitted through the planar surface 220 at the thermal bonding portion 830 reaches first. If the position of the laser irradiation unit 860 is specified in more detail, it may be a widthwise central point in front of the thermal bonding portion 830. Further, the laser welder 900 described hereinafter irradiates a laser beam while moving along the thermal bonding portion 830 so that it may be a widthwise central point of the thermal bonding portion 830 that is being positioned along the thermal bonding portion 830 at the front surface of the thermal bonding portion 830. The laser beam irradiated on the laser irradiation unit 860 heats the thermal bonding portion 830 and fuses the thermal bonding portion 830 and at least a portion of the planar surface 220 opposing the thermal bonding portion 830. In this embodiment, the thermal bonding portion 830 and the thermal bonding groove 221 may be used. This thermal bonding starts from a point opposite to the laser irradiation unit 860 in the thermal bonding portion 830 and the laser irradiation unit 860 in the thermal bonding groove 221.

On the other hand, in laser welding, when a laser beam is irradiated to a transmitting material (planar surface 220 in the present invention, more specifically, thermal bonding groove 221), laser light is transmitted through an absorbing material (thermal bonding portion 830 in the present invention), thereby generating heat. In this case, as the thermal bonding heat of the absorbing material heats and melts the surface of the light transmissive material, both of the light transmissive material and the light absorbing material are thermally bonded together. Further, when the above process is performed under a pressurized condition, the thermal bonding strength is increased.

Heat generated in the laser irradiation unit 860 during the laser welding process can be transferred to the neighboring gasket 300. The gasket 300 is made of an elastic rubber material and is poor in heat resistance. As a result, there may be a problem in that the gasket 300 is damaged by deterioration, thereby degrading the sealing performance. In order to solve such a problem, in the present invention, the shortest distance a (see FIG. 4) between the surface of the laser irradiation unit 860 and the gasket 300 may be 2 mm or more. That is, the step of the thermal bonding portion 830 is secured so as to prevent the gasket 300 from being damaged by deterioration.

Figure 6:
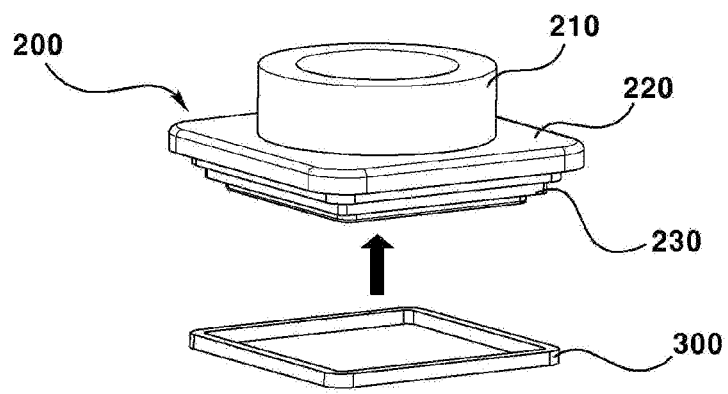
FIGS. 6 to 8 are conceptual views showing a method of manufacturing the camera housing of the first embodiment.
Figure 7:
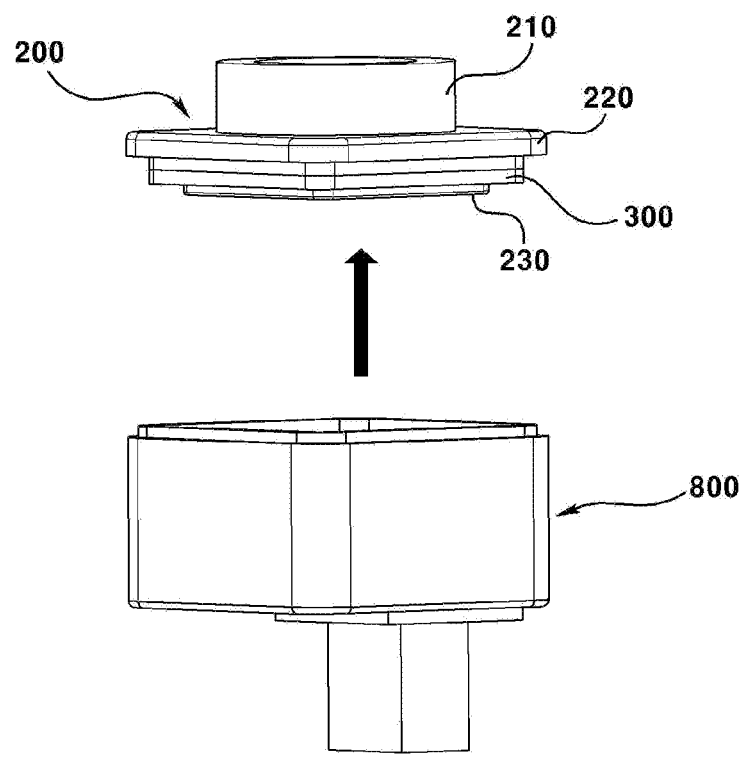
Figure 8:
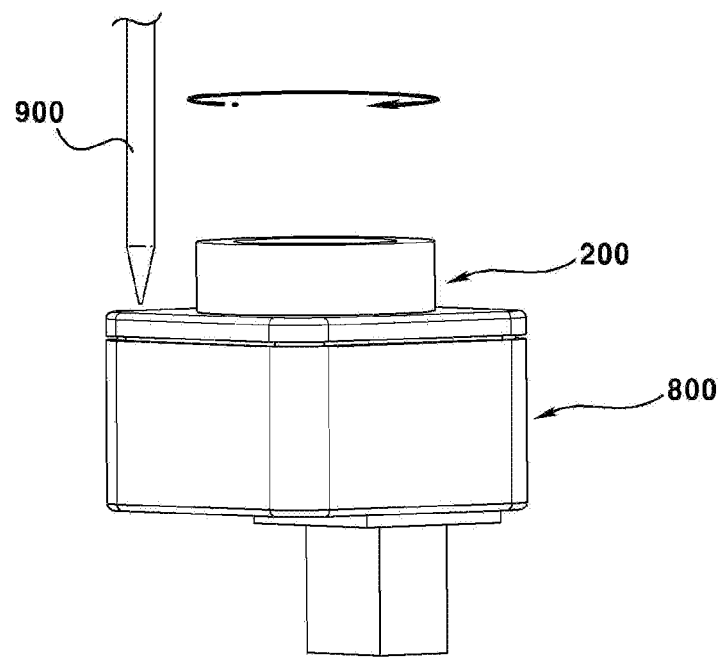
Figure 9:
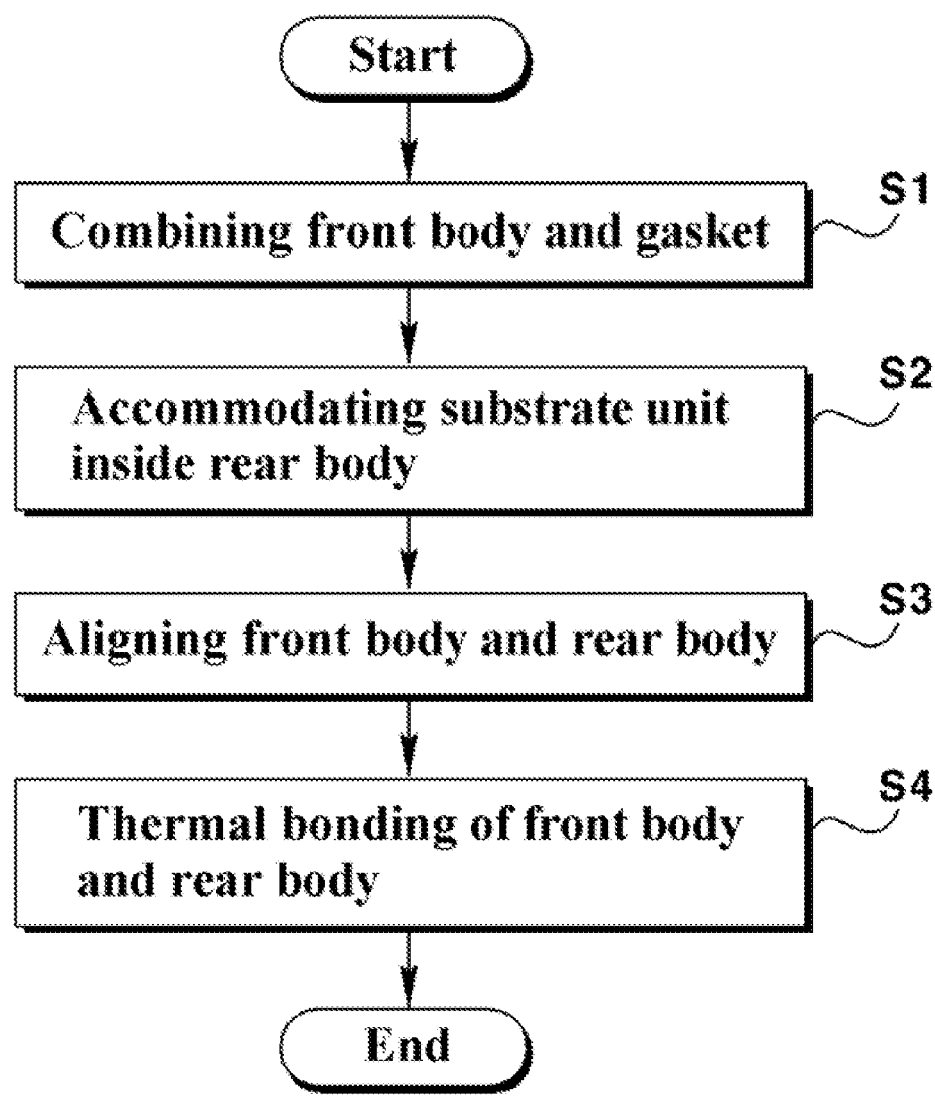
FIG. 9 is a flowchart showing a method of manufacturing the camera housing of the first embodiment.

Hereinafter, a manufacturing method of a camera module 1000 of the first embodiment will be described with reference to the drawings. FIGS. 6, 7, and 8 are conceptual views showing the manufacturing method of the camera module according to the first embodiment, and FIG. 9 is a flowchart showing a manufacturing method of the camera module according to the first embodiment.

The manufacturing method of the camera module 1000 according to the present embodiment comprises the steps of: S1, combining the front body 200 and the gasket 300; S2, accommodating the substrate portion 500 in the rear body 800; S3, aligning the front body 200 and the rear body 800, and achieving close contact therebetween; and S4, fusing the front body 200 and the rear body 800 so as to form a camera module 1000.

FIG. 6 is a conceptual diagram showing a first step S1. In the first step S1, the gasket 300 is combined to the flange portion 230 by insertingly combining the gasket 300 into the cover 200. More specifically, the gasket 300 can be inserted into the rear end of the step of the flange portion 230. In this case, the gasket 300 may enter the flange portion 230 from the rear direction towards the front direction. As a result, the flange portion 230 is penetratingly inserted through the gasket 300, and the gasket 300 can be positioned along the circumference of the rear end of the step of the flange portion 230. Therefore, the inner side surface of the gasket 300 can be in contact with the outer side surface of the flange portion 230. The front surface of the gasket 300 may be in contact with the rear surface of the front end of the step of the flange portion 230.

The second step S2 is a step of accommodating the substrate portion 500 in the rear body 800 and may install the substrate portion 500 in the inner space of the rear body 800. In this case, the substrate portion 500 can be insertingly combined with the rear body 800. In addition, the substrate portion 500 can be bonded to the rear body 800. In addition, the rear body 800 wherein the substrate portion 500 is closely contacted can be manufactured by insertion molding of the substrate portion 500. Meanwhile, in the alternative embodiment of the present embodiment, the substrate portion 500 may be screw-combined to the front body 200. In this case, the second step S2 may be a step of coupling the substrate portion 500 to the front body 200.

FIG. 7 is a conceptual diagram showing the third step S3. The third step S3 is a step of aligning and contacting the front body 200 and the rear body 800 to each other. First, the thermal bonding groove 221 of the front body 200 and the thermal bonding portion 830 of the rear body 800 are aligned so as to oppose each other. Thereafter, the front body 200 and/or the rear body 800 are moved in the front-to-rear direction so that the thermal bonding portion 830 of the rear body 800 is inserted into the thermal bonding groove 221 of the front body 200 so as be insertingly combined. As a result, the front body 200 can cover the opening 810 of the rear body 800. The thermal bonding portion 830 can be in contact with the thermal bonding groove 221. The outer side surface of the gasket 300 may be in contact with the inner side surface of the side surface 820 of the rear body 800. The rear surface of the gasket 300 may be in contact with the gasket support portion 840 of the rear body 800. In this case, the gasket 300 is influenced by the combining pressure of the front body 200 and the rear body 800. That is, the gasket 300 can be pressed by the front end of the step of the flange portion 230 of the planar surface 220 and the gasket support portion 840.

FIG. 8 is a conceptual diagram showing the fourth step S4. In the fourth step S4, the front body 200 and the rear body 800 are laser-welded. The laser welder 900 can emit a high power diode laser (HPDL). The laser welder 900 can emit the laser beam towards the downward direction from the upper side. The laser welder 900 can emit a laser beam in front of the front body 200. The laser welder 900 can emit a laser beam while moving along the thermal bonding portion 830. The laser light can be transmitted through the front body 200 and irradiated to the laser irradiation unit 860 of the thermal bonding portion 830. Therefore, the thermal bonding portion 830 and the planar surface 220 opposing to each other (in this embodiment, the thermal bonding groove 221) can be thermally bonded.

Figure 10:
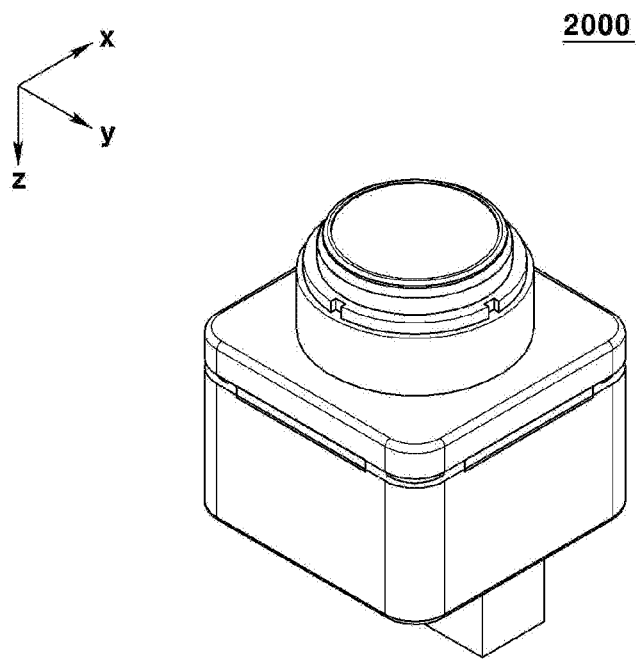
FIG. 10 is a perspective view showing a camera module of a second embodiment.
Figure 11:
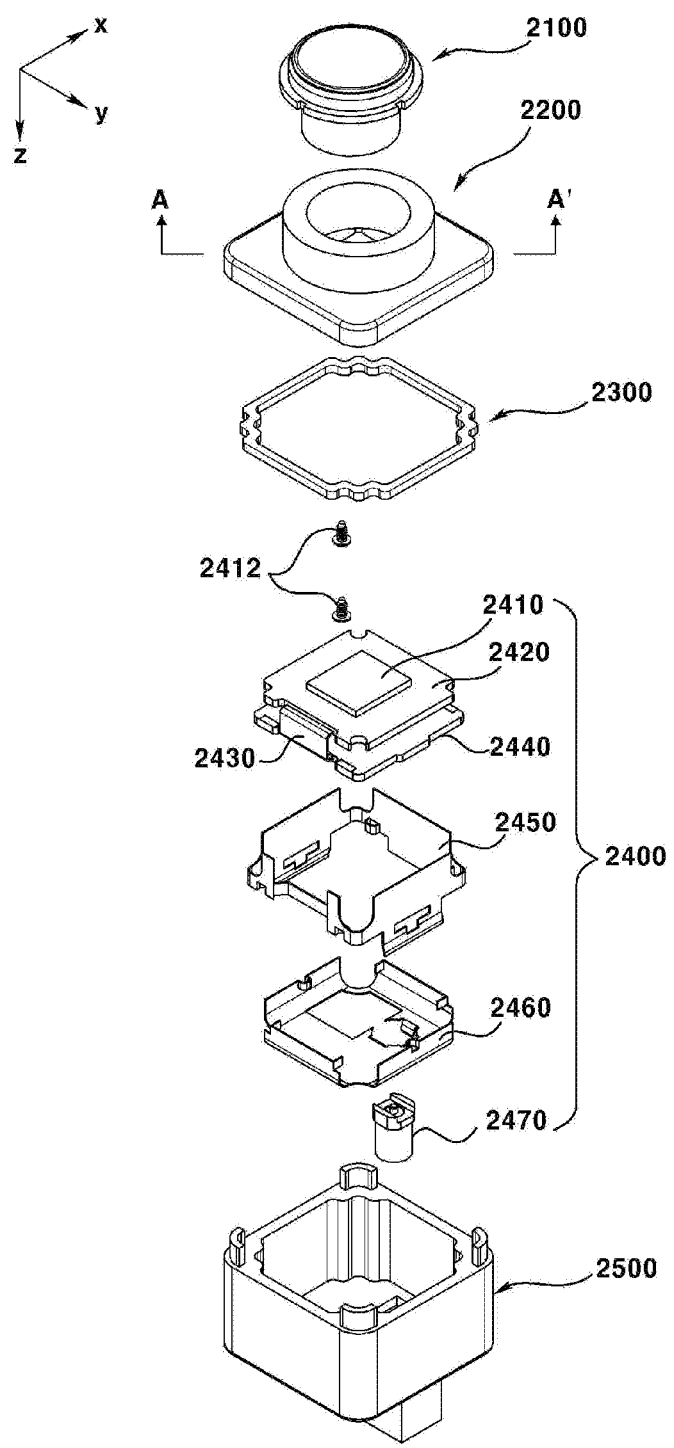
FIG. 11 is an exploded perspective view showing the camera module of the second embodiment.
Figure 12:
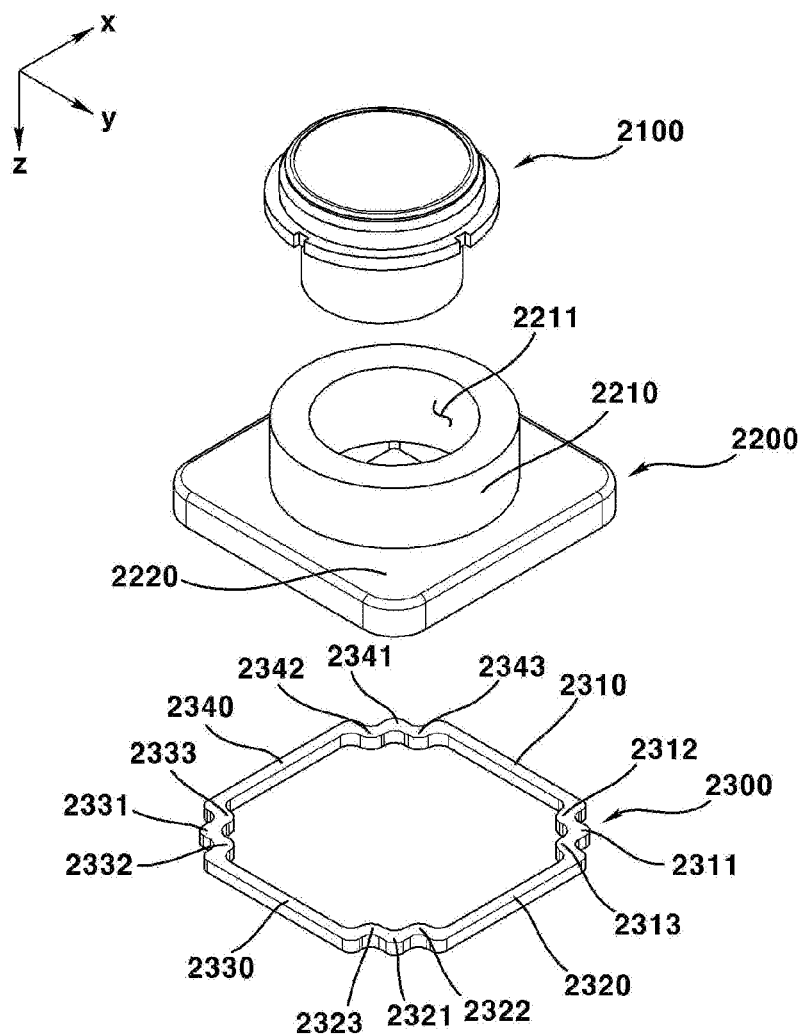
FIG. 12 is an exploded perspective view showing a lens barrel, a front body, and a gasket of the camera module of the second embodiment.
Figure 13:
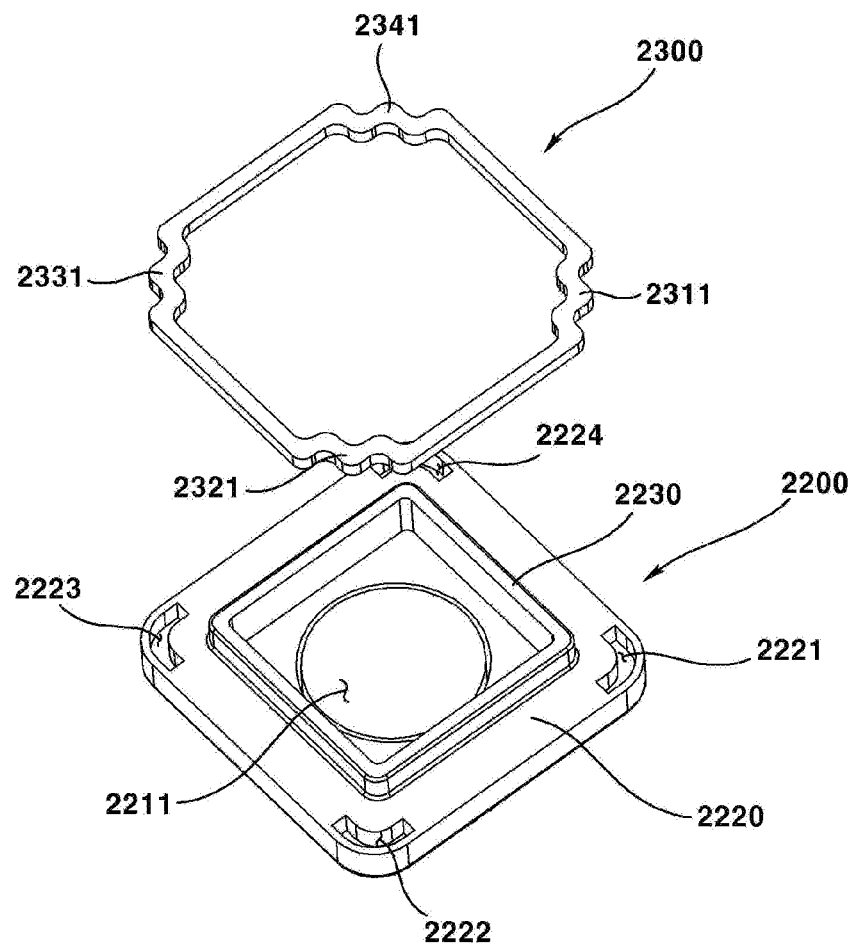
FIG. 13 is a perspective view of the front body and the gasket of the second embodiment as viewed from the rear.
Figure 14:
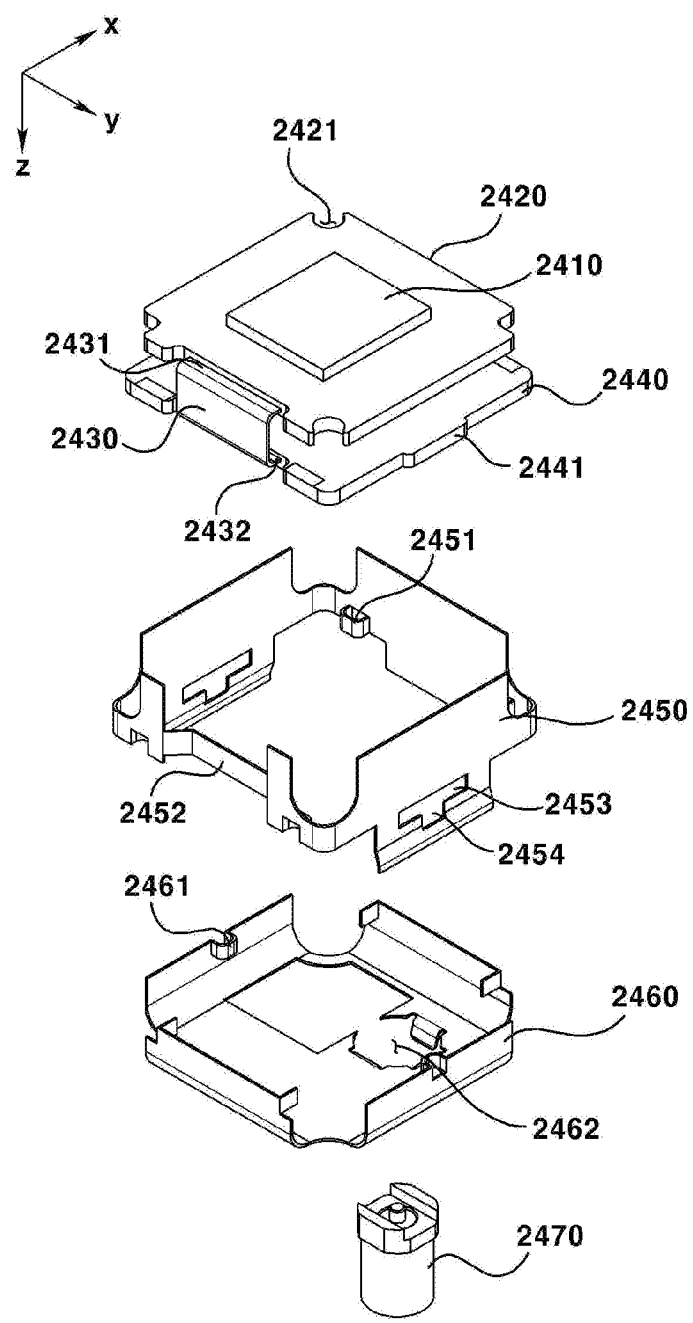
FIG. 14 is an exploded perspective view showing a substrate unit of the camera module of the second embodiment.
Figure 15:
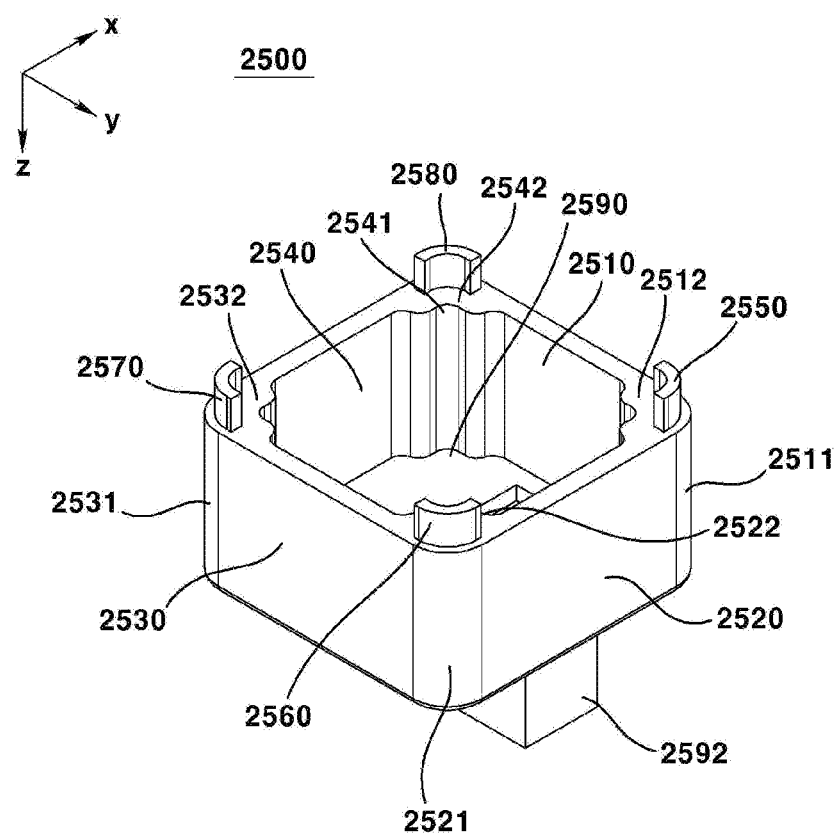
FIG. 15 is a perspective view showing a rear body of the second embodiment.
Figure 16:
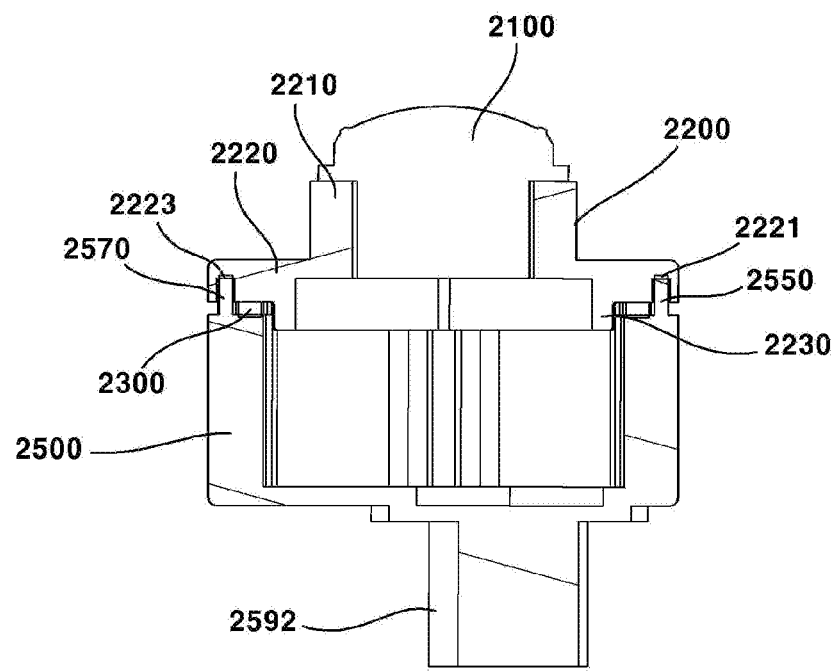
FIG. 16 is a cross-sectional view showing the combined state of the front body, the rear body, and the gasket of the second embodiment
Figure 17:
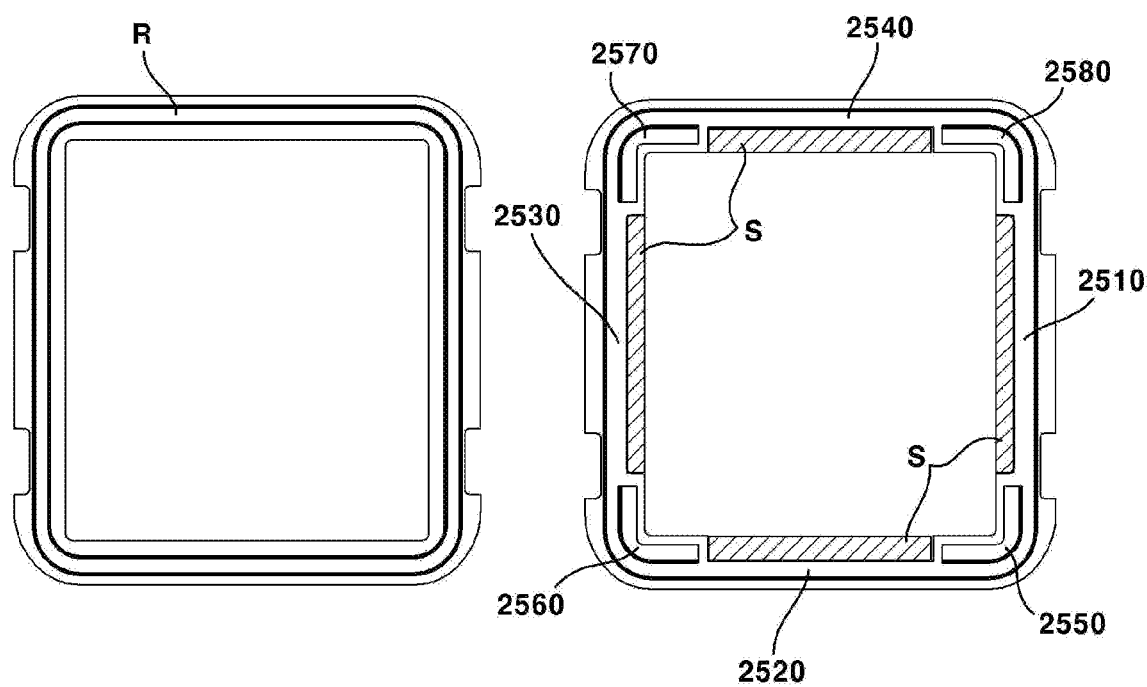
FIG. 17 is a cross-sectional view showing a rear body of a comparative example and the rear body of the second embodiment.

Hereinafter, a camera module 2000 of the second embodiment will be described with reference to the drawings. FIG. 10 is a perspective view showing the camera module of the second embodiment; FIG. 11 is an exploded perspective view showing the camera module of the second embodiment; FIG. 12 is an exploded perspective view showing a lens barrel, a front body, and a gasket of the camera module of the second embodiment; FIG. 13 is a perspective view of the front body and the gasket of the second embodiment as viewed from the rear; FIG. 14 is an exploded perspective view showing a substrate unit of the camera module of the second embodiment; FIG. 15 is a perspective view showing a rear body of the second embodiment; FIG. 16 is a cross-sectional view showing the combined state of the front body, the rear body, and the gasket of the second embodiment; and FIG. 17 is a cross-sectional view showing a rear body of a comparative example and the rear body of the second embodiment.

The camera module 2000 according to the second embodiment may comprise a lens barrel 2100, a front body 2200, a gasket 2300, a substrate unit 2400, and a rear body 2500.

The lens barrel 2100 can accommodate at least one lens. The lens barrel 2100 may have an optical axis. In this case, the lenses may be aligned by screw-combined or adhered to the lens barrel 2100. When there are a plurality of lenses, the lenses can be spaced apart and aligned along the front-to-rear direction. Therefore, the lens barrel 2100 may have an optical axis. The lens barrel 2100 may be located in the front body 2200. The lens barrel 2100 can be fixedly coupled with a lens barrel holder 2210 of the front body 2200. In this case, the lens barrel 2100 can be inserted backward into the lens barrel holder 2210. In addition, the lens barrel 2100 may close the lens barrel holder hole 2211 of the lens barrel holder 2210. In this case, the outer side surface of the lens barrel 2100 can be in contact with the lens barrel holder hole 2211. In this case, the lens barrel 2100 can be screw-combined or adhered to the lens barrel holder hole 2211. However, in this alternative embodiment (not shown), the lens barrel 2100 may be omitted. In this case, at least one lens can be screw-combined or bonded to the lens barrel holder hole 2211 directly. Light that has passed through the lens barrel 2100 can be irradiated to an image sensor 2400 which will be described later.

The front body 2200 can be combined with the lens barrel 2100 as described above. The front body 2200 may be disposed in front of the rear body 2500. The front body 2200 can be combined with the rear body 2500. In this case, the front body 2200 can cover an opening 2510 of the rear body 2500. The front body 2200 may comprise a plastic material. The front body 2200 may comprise a plastic material mixed with carbon or metal. The front body 2200 may comprise a plastic material mixed with a laser-transmissive plastic material or laser-transmissive carbon or metal. Adding carbon or metal to plastics can improve heat dissipation property, durability, and electromagnetic shielding property. However, if the ratio of carbon or metal is too high, thermal bonding may not be performed well. Accordingly, when the material of the front body 2200 is selected, the ratio of plastic to carbon or metal can be properly trade-off. The front body 2200 and the rear body 2500 can be combined together by thermal bonding. In this case, thermal bonding can be achieved by laser welding under pressure. A gasket 2300 may be disposed at rear of the front body 2200. In this case, the rear surface of the front body 2200 and the front surface of the gasket 2300 can be in contact with each other. The front body 2200 may comprise a lens barrel holder 2210, a flange portion 2220, and a gasket holder 2230. In this case, the lens barrel holder 2210, the flange portion 2220, and the gasket holder 2230 may be integrally formed.

The lens barrel holder 2210 may have a hollow cylindrical shape, and a lens barrel hole 2211 may be formed therein. The lens barrel 2100 may be disposed and fixed to the lens barrel holder 2210. In this case, the outer side surface of the lens barrel 2100 and the inner side surface of the lens barrel hole 2211 may be in contact with and fixed to each other. A flange portion 2220 may be disposed at the rear side of the lens barrel holder 2210.

The flange portion 2220 may be shaped to extend outwardly from the rear of the lens barrel accommodating portion 2210. The flange portion 2220 can be penetrated by the lens barrel hole 2211. The lens barrel hole 2211 may be formed at the center of the flange portion 2220. That is, the lens barrel hole 2211 can be extended up to the flange portion 2220. The flange portion 2220 may be in the form of a plate. The flange portion 2220 may be in the form of a square plate. The flange portion 2220 may be disposed in front of the rear body 2500. The flange portion 2220 may close an opening 2590 of the rear body 2500 in the shape of a block. The gasket holder 2230 may be disposed at the rear side of the flange portion 2220. The shape of the flange portion 2220 is not limited to the plate shape described above. That is, the flange portion 2220 may have any shape as long as it covers the rear body 2500 and being penetrated by the lens barrel hole 2211. Thus, the flange portion 2220 may be referred to as a "cover member."

A first, a second, a third, and a fourth rib grooves 2221, 2222, 2223, and 2224 may be formed at the rear surface of the flange portion 2200. The first, second, third, and fourth rib grooves 2221, 2222, 2223, and 2224 may be slots forwardly recessed from the rear surface of the flange portion 2200. The first, second, third, and fourth rib grooves 2221, 2222, 2223, and 2224 may be disposed outside the rear surface of the flange portion 2200. The first, second, third, and fourth rib grooves 2221, 2222, 2223, and 2224 may be disposed at corner portions of the flange portion 2200. Each of the first, second, third, and fourth rib grooves 2221, 2222, 2223, and 2224 may accommodate first, second, third, and fourth ribs 2550, 2560, 2570, and 2580, respectively. Accordingly, each of the first, second, third, and fourth rib grooves 2221, 2222, 2223, and 2224 may have the shape corresponding to the first, second, third, and fourth ribs 2550, 2560, 2570, and 2580, respectively. The front body 2200 and the rear body 2500 can be combined by thermal bonding between the first, second, third and fourth rib grooves 2221, 2222, 2223, and 2224 and the first, second, third and fourth ribs 2550, 2560, 2570, and 2580, respectively. More particularly, the front body 2200 and the rear body 2500 can be combined by thermal bonding between the first, second, third and fourth rib grooves 2221, 2222, 2223, and 2224 and the front portions of the first, second, third, and fourth ribs 2550, 2560, 2570, and 2580, respectively.

The lens barrel hole 2211 may be formed in the center of the flange portion 2200. A gasket holder 2230 in the form of a rectangular ring protruding rearward along the circumference of the lens barrel hole 2211 may be disposed at the rear surface of the flange portion 2200 outside the lens barrel hole 2211. The light transmitted through the lens barrel 2100 passes successively through the lens barrel hole 2211 and the inner side of the gasket holder 2230 and may be irradiated to an image sensor 2410 mounted on a first substrate 2430 of the substrate unit 2400 which will be described later.

The gasket holder 2230 may be located on the rear side of the flange portion 2200. The gasket holder 2230 may be in the form of a hollow rectangular ring protruding rearward from the rear surface of the flange portion 2200. The lens barrel hole 2211 may be disposed inside the gasket holder 2230. The gasket 2300, which will be described later, can be combined to the gasket holder 2230. In this case, the gasket holder 2230 can penetrate the gasket 2300.

The outer side surface of the gasket holder 2230 and the inner side surface of the gasket 2300 can be in contact with each other when the front body 2200 and the gasket 2300 are combined. Further, the rear surface of the flange portion 2220 and the upper surface of the gasket 2300 can be in contact with each other. In this case, the first, the second, the third, and the fourth rib grooves 2221, 2222, 2223, and 2224 may be disposed outside the gasket 2300.

The gasket 2300 may be an elastic material. The gasket 2300 may be made of rubber. The gasket 2300 may be interposed between the front body 2200 and the rear body 2500. Therefore, the camera module 2000 of the second embodiment can maintain the airtightness (waterproof property) of the inner space of the rear body 2500 by the gasket 2300. As a result, the substrate unit 2400 installed inside the rear body 2500 can be protected.

The gasket 2300 may have the shape of a rectangular ring comprising a first, a second, a third, and a fourth sides 2310, 2320, 2330, and 2340 and a first, a second, a third, and a fourth corner portions 2311, 2321, 2331, and 2341 which respectively connecting the four sides. In this case, the first, the second, the third and the fourth sides 2310, 2320, 2330, and 2340 and the first, the second, the third and the fourth corner portions 2311, 2321, 2331, and 2341 which respectively connecting the four sides, can be interconnected by a first, a second, a third, a fourth, a fifth, a sixth, a seventh, and an eighth link portions 2312, 2313, 2322, 2323, 2332, 2333, 2342, and 2334.

The first and the second sides 2310 and 2320 may be disposed on the upper side and the left side of the gasket 2300. The first and the second sides 2310 and 2320 may be inclined with respect to each other. The first and second sides 2310 and 2320 may be disposed at right angles to each other. The first gasket corner portion 2311 may be disposed between the first side 2310 and the second side 2320 to form a corner. Therefore, the first gasket corner portion 2311 can be curved or bent. The first gasket corner portion 2311 may be curved or bent outward. The first gasket corner portion 2311 may be connected to the first side 2310 by the first link portion 2312. The first gasket corner portion 2311 may be connected to the second side 2320 by the second link portion 2313. The first and the second link portions 2312 and 2313 may be curved or bent inward. More specifically, the first gasket corner portion 2311 is curved or bent outward, and the portion extending to the right side from the first gasket corner portion 2311 can be connected to the first side 2310 by the second link portion 2312 extending inward from the first side 2310, and the portion extending downward from the first gasket corner portion 2311 can be connected to the second side 2320 by the second link portion 2313 extending inward from the second side 2320. Furthermore, the first link portion 2312 and the second link portion 2313 may be curved or bent inward. As a result, the first corner portion 2311 can be disposed inwardly at one corner of the gasket 2300 in the shape of a square ring. In this case, a rear portion of a first rib 2550, which will be described later, may be disposed in a space defined by the first corner portion 2311 and the first and the second link portions 2312 and 2313 extending inward. The outer side surface of the first corner portion 2311 and the inner side surface of the rear portion of the first rib 2550 can be in contact with each other. Thus, the outer side surface of the first corner portion 2311 and the inner side surface of the rear portion of the first rib 2550 can be curved or bent corresponding to each other. When the front body 2200 and the rear body 2500 are combined, the first corner portion 2311 is covered by the first rib 2550 and the outer side surface the first and the second sides 2310 and 2320 can be exposed to the outside.

The second and the third sides 2320 and 2330 may be disposed on the left and the lower sides of the gasket 2300. The second and the third sides 2320 and 2330 may be disposed to be inclined with respect to each other. The second and the third sides 2320 and 2330 may be disposed at right angles to each other. The second gasket corner portion 2321 may be disposed between the second and the third sides 2320 and 2330 to form a corner. Therefore, the second gasket corner portion 2321 can be curved or bent. The second gasket corner portion 2321 may be curved or bent outward. And the second gasket corner portion 2321 may be connected to the second side 2320 by the third link portion 2322. The second gasket corner portion 2321 may be connected to the third side 2330 by the fourth link portion 2313. The third and the fourth link portions 2322 and 2323 may be curved or bent inward. The second gasket corner portion 2321 is curved or bent outward, and the portion extending upward from the second gasket corner portion 2321 can be connected to the second side 2320 by the second link portion 2322 extending inward from the second side 2320, and the portion extending to the right side of the second gasket corner portion 2321 can be connected to the third side 2330 by the fourth link portion 2323 extending inward from the second side portion 2320. Further, the third link portion 2322 and the fourth link portion 2323 may be curved or bent inward. As a result, the second corner portion 2321 can be disposed inwardly from one corner of the gasket 2300 in the form of a square ring. In this case, a rear portion of a second rib 2560, which will be described later, may be disposed in a space formed by the second corner portion 2321 which is recessed inward and the third and the fourth link portions 2322 and 2323 which are extended inward. The outer side surface of the second corner portion 2321 and the inner side surface of the rear portion of the second rib 2560 can be in contact with each other. Therefore, the outer side surface of the second corner portion 2321 and the inner side surface of the rear portion of the second rib 2560 can be curved or bent corresponding to each other. When the front body 2200 and the rear body 2500 are combined, the second corner portion 2321 is covered by the second rib 2560, and the outer side surfaces of the second and the third sides 2320 and 2330 can be exposed to the outside.

The third and the fourth sides 2330 and 2340 may be disposed on the lower side and the right side of the gasket 2300. The third and the fourth sides 2330 and 2340 may be disposed to be inclined with respect to each other. The third and the fourth sides 2330 and 2340 may be disposed at right angles to each other. The third gasket corner portion 2331 may be disposed between the third and the fourth sides 2330 and 2340 to form a corner. Therefore, the third gasket corner portion 2331 can be curved or bent. The third gasket corner portion 2331 may be curved or bent outward. The third gasket corner portion 2331 may be connected to the third side 2330 by the fifth link portion 2332. The third gasket corner portion 2331 may be connected to the fourth side 2340 by the sixth link portion 2333. The fifth and the sixth link portions 2332 and 2333 may be curved or bent inward. More specifically, the third gasket corner portion 2331 is curved or bent outward, and the portion extending to the left in the third gasket corner portion 2331 can be connected to the third side 2330 by the fifth link portion 2330 extending inward from the third side 2330, and the portion of the third gasket corner portion 2331 extending upward may be connected to the fourth side 2340 by the sixth link portion 2333 extending inward from the third side 2330. Further, the fifth link portion 2332 and the sixth link portion 2333 may be curved or bent inward. As a result, the third corner portion 2331 can be disposed inwardly at one corner of the gasket 2300 in the shape of a square ring. In this case, a rear portion of the third rib 2570, which will be described later, may be disposed in a space formed by the third corner portion 2331 which is recessed inward and the fifth and the sixth link portions 2332 and 2333 extending inward. The outer side surface of the third corner portion 2331 and the inner side surface of the rear portion of the third rib 2570 can be in contact with each other. Accordingly, the outer side surface of the third corner portion 2331 and the inner side surface of the rear portion of the third rib 2570 can be curved or bent corresponding to each other. The third corner portion 2331 is covered by the third rib 2570 when the front body 2200 and the rear body 2500 are combined, and the outer side surfaces of the third and the fourth sides 2330 and 2340 can be exposed to the outside.

The first and the fourth sides 2310 and 2340 may be disposed on the upper side and the right side of the gasket 2300. The first and the fourth sides 2310 and 2340 may be disposed to be inclined with respect to each other. The first and the fourth sides 2310 and 2340 may be disposed at right angles to each other. The fourth gasket corner portion 2341 may be disposed between the first and the fourth sides 2310 and 2340 to form a corner. Therefore, the fourth gasket corner portion 2341 can be curved or bent. The fourth gasket corner portion 2341 may be curved or bent outward. The fourth gasket corner portion 2341 may be connected to the first side 2310 by the eighth link portion 2343. The fourth gasket corner portion 2341 may be connected to the fourth side 2340 by a seventh connecting portion 2342. The seventh and the eighth link portions 2342 and 2334 may be curved or bent inward. More specifically, the fourth gasket corner portion 2341 is curved or bent outward, and the portion extending forward at the fourth gasket corner portion 2341 may be connected to the fourth side 2340 by the seventh link portion 2342 extending inward from the fourth side 2340, and a portion extending to the left in the first gasket corner portion 2341 may be connected to the first side 2310 by the eighth link portion 2343 extending inward from the fourth side 2340. Furthermore, the seventh link portion 2342 and the eighth link portion 2343 may be curved or bent inward. As a result, the fourth corner portion 2341 can be disposed inwardly at one corner of the gasket 2300 in the shape of a square ring. In this case, a rear portion of the fourth rib 2580, which will be described later, may be disposed in a space formed by the fourth corner portion 2341 which is inwardly inserted and the seventh and the eighth link portions 2342 and 2334 extending inward. The outer side surface of the fourth corner portion 2341 and the inner side surface of the rear portion of the fourth rib 2580 can be in contact with each other. Accordingly, the outer side surface of the fourth corner portion 2341 and the inner side surface of the rear portion of the fourth rib 2580 can be curved or bent correspondingly. In summary of the above description, when the front body 2200 and the rear body 2500 are combined, the fourth corner portion 2341 is covered by the fourth rib 2580, and the outer side surfaces of the first and the second sides 2310 and 2340 can be exposed to the outside.

The upper surface of the gasket 2300 can be in contact with the bottom surface of the front body 2200. The upper surface of the gasket 2300 can be in contact with the bottom surface of the flange portion 2220. The bottom surface of the gasket 2300 can be in contact with the upper surface of the sidewall portion 2501 of the rear body 2500. The bottom surface of the gasket 2300 may be in contact with a first, a second, a third, and a fourth sidewalls 2510, 2520, 2530, and 2540 and the upper surfaces of the first, the second, the third, and the fourth corner sidewalls 2511, 2521, 2531, and 2541. Accordingly, the gasket 2300 can receive the compressive force along the front-to-rear direction when the front body 2200 and the rear body 2500 are combined. As a result, airtightness provided by the gasket 2300 can be improved.

In summary of the above description, the inner side surface of the gasket 2300 can be in contact with the outer side surface of the gasket holder 2230. The outer side surfaces of the first, the second, the third, and the fourth corner portions 2311, 2321, 2331, and 2341 of the gasket 2300 may be in contact with the inner side surfaces of the rear portions of the first, the second, the third, and the fourth ribs 2550, 2560, 2570, and 2580. It can be in contact with the. The outer side surfaces of the first, the second, the third, and the fourth corner portions 2311, 2321, 2331, and 2341 of the gasket 2300 are covered by the first, the second, the third, and the fourth ribs 2550, 2560, 2570, and 2580 so that they may not be exposed to the outside. The outer side surfaces of the first, second, third, and fourth sides 2310, 2320, 2330, and 2340 of the gasket 2300 may be exposed to the outside.

The substrate unit 2400 can be accommodated in the inner space of the rear body 2500. The substrate unit 2400 may be positioned in the inner space of the rear body 2500 by screw-combining the front body 2200. The substrate unit 2400 may be positioned in the inner space of the rear body 2500 by bonding with the front body 2200 or the rear body 2500. The substrate unit 2400 comprises an image sensor 2410, a first substrate 2420, a second substrate 2430, a third substrate 2440, a side can 2450, a rear can 2460 and a connector 2470.

The image sensor 2410 may be accommodated in the inner space of the rear body 2500. The image sensor 2410 may be mounted on the first substrate 2420 which will be described later. The image sensor 2410 may be located on the front surface of the first substrate 2420 located above the substrate unit 2400. The image sensor 2410 may be disposed such that the optical axis thereof coincides with the lens barrel 2100. Thus, the image sensor 2410 can receive the light that has passed through the lens barrel 2100. In this case, the image sensor 2410 can output the irradiated light as an image. The image sensor 2410 may be a charge coupled device (CCD), a metal oxide semi-conductor (MOS), a CPD, and a CID. However, the type of the image sensor 2410 is not limited thereto.

The substrate unit 2400 may comprise at least one substrate. In the second embodiment, a total of three substrates a first, a second, and a third substrates 2420, 2430, and 2440 are included.

The first substrate 2420 may be spaced apart from the third substrate 2440 and positioned at the top of the substrate unit 2400. The first substrate 2420 may be connected to the third substrate 2440 by the second substrate 2430. The image sensor 2410 may be mounted on the front surface of the first substrate 2420. The first substrate 2420 can be covered by a shield can. In this case, the four sides of the first substrate 2420 can be in contact with the inner side surface of the shield can. The first substrate 2420 may be supported by a first substrate support 2451 of the side can 2450 which will be described later. The upper portion of the first substrate 2420 may be supported by being in contact with the first substrate supporting portion 2451. The first substrate 2420 may be fixed to the rear portion of the front body 2200 by screw-combining. At least a portion of the corners of the first substrate 2420 may be formed with a screw groove 2421 recessed in an arc or a circular shape. The screw 2422 may penetrating through the screw groove 2421 to fix the first substrate 2420 to the rear portion of the front body 2200. The first substrate 2420 can be fixed to the front body 2200 by the combining pressure of the screw. The first substrate 2420 may be a printed circuit board (PCB) in the form of a square plate. The first substrate 2420 can electronically control the camera module 2000. At least a portion of four sides of the first substrate 2420 may have a ground terminal (not shown) in contact with the shield can. As a result, the residual electromagnetic force of the first substrate 2420 can escape to the outside through the shield can.

The second substrate 2430 may be positioned between the first substrate 2420 and the third substrate 2440 to interconnect the first substrate 2420 and the third substrate 2440. A substrate of a certain area or more is required for electronic control of the camera module 2000, however, cross-section of the inner space of the rear body 2500 is smaller than that of the rear body 2500 due to the design requirements of a vehicle camera. Therefore, stacking of a plurality of substrates such as the first substrate 2420 and the third substrate 2440 of the present invention is common, and a connecting substrate such as a second substrate 2430 is provided for electrical interconnection of the plurality of substrates. Meanwhile, since the front body 2200 and the rear body 2500 of the present invention are combined by laser welding, not by screw-combining, an internal space wherein the substrate unit 2400 is to be built can be maximally provided. The second substrate 2430 may be a flexible printed circuit board (FPCB) in the form of a square plate erected in the front-to-rear direction. As a result, a curved first substrate connection portion 2431 may be disposed on the front side of the second substrate 2430, and a curved third substrate connection portion 2432 may be disposed on the rear side of the second substrate 2430. The first substrate connection portion 2431 may be electrically connected to a side located below the first substrate 2420. In this case, the terminal of the first substrate connection portion 2431 and the terminal disposed on the lower side of the first substrate 2420 may be electrically connected by soldering. The third substrate connection portion 2432 may be electrically connected to a side located below the third substrate 2440. In this case, the terminal of the third substrate connection portion 2432 and the terminal disposed at the lower side of the third substrate 2440 may be electrically connected by soldering. The second substrate 2430 may be located outside (below) a second substrate holding portion 2452 of the side can 2450 which will be described later. Therefore, the internal movement of the second substrate 2430 can be restricted by the second substrate holding portion 2452.

The third substrate 2440 may be spaced apart from the first substrate 2420 and may be located at the lower end of the substrate unit 2400. The third substrate 2440 may be connected to the first substrate 2410 through the second substrate 2430. A connector 2470 to be described later may be mounted on the lower surface of the third substrate 2440. The third substrate 2440 can be covered by the shield can. In this case, the four sides of the third substrate 2440 can be in contact with the inner side surface of the shield can. The third substrate 2440 can be fixed to the side can 2450 by a third substrate protrusion 2441 being inserted into a third substrate holding groove 2453 of the side can 2450 which will be described later. The third substrate protrusion 2441 may be in the form of a protrusion extending outward from the right and left side surfaces of the third substrate 2440. The third substrate protrusion 2441 may be inserted into the third substrate locking hole 2453 to apply a supporting force to the third substrate 2440. The third substrate 2440 may be a printed circuit board (PCB) in the form of a square plate. The third substrate 2440 may electronically control the camera module 2000. The third substrate protrusion 2441 may perform the function of a grounding terminal. As a result, the residual electromagnetic force of the third substrate 2440 can escape to the outside through the shield can.

The shield can may be accommodated in the inner space of the rear body 2500. In this case, the outer side surface of the shield can is in contact with the inner side surface of the rear body 2500. Inside the shield can, an image sensor 2410, a first, a second, and a third substrates 2420, 2430, and 2440 and a connector 2470 may be accommodated. The image sensor 2410 mounted on the first substrate 2420 may be located on the uppermost side of the inside of the shield can. The connector 2470 penetrating the lower surface of the shield can may be positioned at the rear portion of the shield can. The shield can may be in the form of a block with an open front. As a result, the light transmitted through the lens barrel 2100 can be irradiated to the image sensor 2410. The shield can may be formed of a metal material. More specifically, the shield can may be formed of a metal plate. In this case, the shield can may block electromagnetic interference (EMI). That is, the shield can may prevent the electromagnetic waves generated from the outside from entering into the substrate unit. Since the first and the third substrates 2420 and 2440 are grounded to the shield can and the second substrate 2430 is electrically connected to the first and the third substrates 2420 and 2440 as described above, The residual electromagnetic force remaining on the first, the second, and the third substrates 2420, 2430, and 2440 can escape to the outside through the shield can. However, the material of the shield can is not limited thereto. The shield can may comprise a side can 2450 and a rear can 2460. In this case, the side can 2450 and the rear can 2460 can be assembled. However, in a modified example (not shown) of this embodiment, the side can and the rear can may be integrally formed.

The side can 2450 may be accommodated in the inner space of the rear body 2500. In this case, the outer side surface of the side can 2450 may be in contact with the inner side surface of the rear body 2500. The rear can 2460 may be positioned at rear of the side can 2450. The first, the second, and the third substrates 2420, 2430, and 2440 can be accommodated inside the side can 2450. The side can 2450 may be a hollow rectangular parallelepiped. The front and rear sides of the side can 2450 may be open. As a result, the side can 2450 may form the side surface of the shield can. The first substrate support portion 2451 protruding inward can be positioned at the inner side surface of the upper side of the side can 2450. The first substrate support portion 2451 may support the first substrate 2420 by being contacted with the upper portion of the rear surface of the first substrate 2420. The second substrate holding portion 2452 may be positioned on a surface portion of the lower side of the side can 2450. The second substrate holding portion 2452 may have a smaller cross-sectional area than the other surface of the side can 2450. That is, the second substrate holding portion 2452 may be a flat bar. The second substrate 2430 may be positioned outside (downward) of the second substrate holding portion 2452. As a result, when the second substrate 2430 moves upward due to an unexpected external force, it can be braked as being stopped by the second substrate holding portion 2452. A third substrate holding hole 2453 and a rear can holding hole 2454 may be formed on the left and right side surfaces of the side can 2450. The shape of the third substrate holding hole 2453 may correspond to the shape of the third substrate protrusion 2441 described above. Therefore, the third substrate protrusion 2441 can be inserted into the third substrate holding hole 2453. As a result, the third substrate 2440 can be fixed to the side can 2450. The position of the third substrate holding hole 2453 is lower than the position of the first substrate support portion 2451, therefore the third substrate 2440 can be located at the rear direction of the first substrate 2420. The shape of the rear can holding hole 2454 may correspond to the shape of the rear can protrusion 2461 which will be described later. Therefore, the rear can protruding portion 2461 can be inserted into the rear can holding hole 2454. As a result, the rear can 2460 can be assembled to the side can 2450 and fixed to the rear of the side can 2450. The third substrate holding hole 2453 and the rear can holding hole 2454 may be integrally formed.

The rear can 2460 can be accommodated in the inner space of the rear body 2500. In this case, the outer side surface of the rear can 2460 may be in contact with the inner side surface of the rear body 2500. The side can 2450 may be positioned in front of the rear can 2460. A connector 2470 that penetrates through the rear surface of the rear can 2460 can be positioned behind the rear can 2460. A connector through hole 2462 may be formed on the rear surface of the rear can 2460 and the connector 2470 may penetrate the rear surface of the rear can 2460 through the connector through hole 2462. The rear can 2460 may have a flat plate and side surfaces extending forward from each of its four sides. Therefore, the front side portion and the corners of the rear can 2460 may be open along the front-to-rear direction. A rear can protrusion 2461 extending inwardly may be formed at the upper center of the left and right sides of the rear can 2460. The rear can protrusion 2461 can be inserted into the rear can holding hole 2454. Thus, the side of the rear can 2460 may be fixed to the side can 2450 to cover the rear end of the side can 2450. As a result, the rear can 2460 may form the rear surface of the shield can.

The connector 2470 can be accommodated in the inner space of the rear body 2500. The connector 2460 may be mounted on the third substrate 2440. The connector 2470 may be mounted on the rear surface of the third substrate 2440. The connector 2470 may have a cylindrical shape and a terminal may be located on the front surface thereof. The terminal of the connector 2470 may be soldered to the terminal formed on the rear surface of the third substrate 2440. The connector 2470 can penetrate the rear can 2460 through the connector through hole 2462. The connector 2470 penetrating the rear can 2460 can be accommodated in a connector accommodating portion 2592 of the rear body 2500 which will be described later. The connector 2470 may be electrically connected to a cable (not shown). The cable may be a conductive line interconnecting an external electronic device and the camera module 2000. Accordingly, the image signal output from the camera module 2000 can be transmitted to the external electronic device via the cable. Accordingly, the image signal captured by the camera module 2000 may be stored in the external electronic device or displayed. In addition, the external electronic device can supply power to the camera module 2000 through the cable. In addition, the external electronic device can control the camera module 2000 by sending a control signal to the camera module 2000 through the cable.

The rear body 2500 may be disposed at the rear side of the front body 2200. The rear body 2500 may comprise a rear surface and a sidewall portion extending forward from the rear surface. The front side of the rear body 2500 is open as being defined by the rear surface and sidewall portions, and an inner space 2590 can be formed. The front opening of the rear body 2500 can be closed by the front body 2200. In this case, the lens barrel hole 2211 of the front body 2200 can communicate with the inner space 2590 of the rear body 2500. As a result, the light transmitted through the lens barrel 2100 can be irradiated to the image sensor 2410 located inside the inner space 2590 of the rear body 2500 after passing through the lens barrel hole 2211. The rear body 2500 may comprise a plastic material. The rear body 2500 may comprise a plastic material mixed with carbon or metal. The rear body 2500 may comprise a laser absorbent plastic material or a plastic material mixed with laser absorbing carbon or metal. The rear body 2500 and the front body 2200 can be combined. The first, the second, the third, and the fourth ribs 2550, 2560, 2570, and 2580 of the rear body 2500 are accommodated inside the first, the second, the third, and the fourth rib grooves 2221, 2222, 2223, and 2224 of the front body 2200, and thermally bonded together so that the rear body 2500 and the front body 2200 can be combined with each other. In this case, the gasket 2300 may be interposed between the rear body 2500 and the front body 2200. As a result, the inner space 2590 of the rear body 2500 can be sealed.

The sidewall portion may be formed in a shape wherein a front opening is formed by extending forward from the square plate-like rear surface of the rear body 2500. The sidewall portion may comprise: a first, a second, a third, and a fourth sidewalls 2510, 2520, 2530, and 2540; a first, a second, a third, and a fourth corner sidewalls 2511, 2521, 2531, and 2541; and a first, a second, a third, and a fourth ribs 2550, 2560, 2570, and 2580.

The first, the second, the third, and the fourth sidewalls 2510, 2520, 2530, and 2540 may be connected to each other by the first, the second, the third, and the fourth corner sidewalls 2511, 2521, 2531, and 2541. Each of the first, the second, the third, and the fourth ribs 2550, 2560, 2570, and 2580 may have a shape forwardly protruded from the front surfaces of the first, the second, the third, and the fourth corner sidewalls 2511, 2521, 2531, and 2541, respectively. In this case, the first, the second, the third and the fourth ribs 2550, 2560, 2570 and 2580 may be curved or bent along the first, the second, the third and the fourth corner sidewalls 2511, 2521, 2531, and 2541.

The first sidewall 2510 may be disposed above the sidewall portion. The second sidewall 2520 may be disposed on the left side of the sidewall portion. The first and the second sidewalls 2510 and 2520 may be inclinedly disposed with respect to each other. The first and the second sidewalls 2510 and 2520 may be disposed perpendicular to each other. The first and the second sidewalls 2510 and 2520 may be interconnected by a first corner sidewall 2511. Thus, the first corner sidewall 2511 may be in the form of a sidewall bent outward or curved. The first rib 2550 may be formed forwardly protruded from the front surface of the first corner sidewall 2511.

The first rib 2550 is formed on the first corner sidewall 2511 so that the portion of the first corner sidewall 2511 where the gasket 2300 can be supported is eliminated. Also, the first corner sidewall 2511 needs to be reinforced for structural strength and thermal bonding. Accordingly, the first corner sidewall 2511 may comprise a first reinforcing portion 2512. The first reinforcing portion 2512 may be a reinforcing structure which is disposed on the inner side of the first corner sidewall 2511. Accordingly, the first corner sidewall 2511 may have a wall thicker than the first and the second sidewalls 2510 and 2520 by the thickness of the first reinforced portion 2512. The first reinforcing portion 2512 may have the same length along the front-to-rear direction with respect to the sidewall portion. The front surface of the first reinforcing portion 2512 may have a shape corresponding to the rear surface of the first gasket corner portion 2311 and the first and the second link portions 2312 and 2313 of the gasket 2300. Therefore, the front surface of the first reinforcing portion 2512 and the rear surface of the first gasket corner portion 2311 and the first and the second link portions 2312 and 2313 of the gasket 2300 can be in contact with each other. As a result, the front surface of the first corner sidewall 2511 can also be in contact with the rear surface of the gasket 2300 to support the gasket 2300.

The front portion of the first rib 2550 can be accommodated in the first rib groove 2221. The rear portion of the first rib 2550 is not accommodated in the first rib groove 2221 and can be exposed to the outside. The inner side surface of the first rib 2550 may be curved or bent so as to correspond to the outer side surface of the first gasket corner portion 2311 of the gasket 2300. Accordingly, the inner side surface of the first rib 2550 can be in contact with the first gasket corner portion 2311. Therefore, the first gasket corner portion 2311 can be covered by the rear portion of the first rib 2550. As a result, the first gasket corner portion 2311 may not be exposed to the outside.

The second sidewall 2520 may be disposed on the left side of the sidewall portion. The third sidewall 2530 may be disposed below the sidewall portion. The second and the third sidewalls 2520 and 2530 may be inclinedly disposed with respect to each other. The second and the third sidewalls 2520 and 2530 may be disposed perpendicular to each other. The second and the third sidewalls 2520 and 2530 may be interconnected by the second corner sidewall 2521. Thus, the second corner sidewall 2521 may be in the form of a sidewall bent outward or curved. The second rib 2560 may be forwardly protruded from the front surface of the second corner sidewall 2521.

The second rib 2560 is formed on the second corner sidewall 2521 so that the portion of the second corner sidewall 2521 where the gasket 2300 can be supported is eliminated. Also, the second corner sidewall 2521 needs to be reinforced for structural strength and thermal bonding. Accordingly, the second corner sidewall 2521 may comprise a second reinforcing portion 2522. The second reinforcing portion 2522 may be a reinforcing structure which is disposed on the inner side of the second corner sidewall 2521. Accordingly, the second corner sidewall 2521 may have a wall thicker than the second and the third sidewalls 2520 and 2530 by the thickness of the second reinforced portion 2522. The second reinforcing portion 2522 may have the same length along the front-to-rear direction with respect to the sidewall portion. The front surface of the second reinforcing portion 2522 may have a shape corresponding to the rear surface of the second gasket corner portion 2321 and the third and the fourth link portions 2322 and 2323 of the gasket 2300. The front surface of the second reinforcing portion 2522 and the rear surface of the second gasket corner portion 2321 and the third and the fourth link portions 2322 and 2323 of the gasket 2300 can be in contact with each other. As a result, the front surface of the second corner sidewall 2521 can also be in contact with the rear surface of the gasket 2300 to support the gasket 2300.

The front portion of the second rib 2560 can be accommodated in the second rib groove 2222. The rear portion of the second rib 2560 is not accommodated in the second rib groove 2222 and can be exposed to the outside. The inner side surface of the second rib 2560 may be curved or bent so as to correspond to the outer side surface of the second gasket corner portion 2321 of the gasket 2300. Accordingly, the inner side surface of the second rib 2560 can be in contact with the second gasket corner portion 2321. Therefore, the second gasket corner portion 2321 can be covered by the rear portion of the second rib 2560. As a result, the second gasket corner portion 2321 may not be exposed to the outside.

The third sidewall 2530 may be disposed below the sidewall portion. The fourth sidewall 2540 may be disposed below the sidewall portion. The third and the fourth sidewalls 2530 and 2540 may be inclinedly disposed with respect to each other. The third and the fourth sidewalls 2530 and 2540 may be disposed perpendicular to each other. The third and the fourth sidewalls 2530 and 2540 may be interconnected by the third corner sidewall 2531. Thus, the third corner sidewall 2531 may be in the form of a sidewall bent outward or curved. The third rib 2570 may be forwardly protruded from the front surface of the third corner sidewall 2531.

The third ribs 2570 are formed on the third corner sidewall 2531 so that the portion of the third corner sidewall 2531 where the gasket 2300 can be supported is eliminated. Also, the third corner sidewall 2531 needs to be reinforced for structural strength and thermal bonding. Therefore, the third corner sidewall 2531 may comprise a third reinforcing portion 2532. The third reinforcing portion 2532 may be a reinforcing structure which is disposed on the inner side of the third corner sidewall 2531. Therefore, the third corner sidewall 2531 may have a thicker wall than the third and the fourth sidewalls 2530 and 2540 by the thickness of the third reinforcing portion 2532. The third reinforcing portion 2532 may have the same length along the front-to-rear direction with respect to the sidewall portion. The front surface of the third reinforcing portion 2532 may have a shape corresponding to the rear surface of the third gasket corner portion 2331 and the fifth and the sixth link portions 2332 and 2333 of the gasket 2300. The third gasket corner portion 2331 of the gasket 2300 and the rear surfaces of the fifth and the sixth link portions 2332 and 2333 can be in contact with each other, respectively. As a result, the front side surface of the third corner sidewall 2531 can also be in contact with the rear surface of the gasket 2300 to support the gasket 2300.

The front portion of the third rib 2570 can be accommodated in the third rib groove 2223. The rear portion of the third rib 2570 is not accommodated in the third rib groove 2223 and can be exposed to the outside. The inner side surface of the third rib 2570 may be curved or bent so as to correspond to the outer side surface of the third gasket corner portion 2331 of the gasket 2300. Therefore, the inner side surface of the third rib 2570 can be in contact with the third gasket corner portion 2331. The third gasket corner portion 2331 can be covered by the rear portion of the third rib 2570. As a result, the third gasket corner portion 2331 may not be exposed to the outside.

The first sidewall 2510 may be disposed above the sidewall portion. The fourth sidewall 2540 may be disposed on the right side of the sidewall portion. The first and the fourth sidewalls 2510 and 2540 may be inclinedly disposed with respect to each other. The first and the fourth sidewalls 2510 and 2540 may be disposed perpendicular to each other. The first and the fourth sidewalls 2510 and 2540 may be interconnected by the fourth corner sidewall 2541. Thus, the fourth corner sidewall 2541 may be in the form of a sidewall bent outward or curved. The fourth rib 2580 may be forwardly protruded from the front surface of the fourth corner sidewall 2541.

The fourth ribs 2580 are formed on the fourth corner sidewall 2541 so that the portion of the fourth corner sidewall 2541 where the gasket 2300 can be supported is eliminated. In addition, the fourth corner sidewall 2541 needs to be reinforced for structural strength and thermal bonding. Accordingly, the fourth corner sidewall 2541 may comprise a fourth reinforcing portion 2542. The fourth reinforcing portion 2542 may be disposed on the inner side of the fourth corner sidewall 2541 so as to be reinforced. Accordingly, the fourth corner sidewall 2541 may have a wall thicker than the first and the fourth sidewalls 2510 and 2540 by the thickness of the fourth reinforcing portion 2542. The fourth reinforcing portion 2542 may have the same length along the front-to-rear direction with respect to the sidewall portion. The front surface of the fourth reinforcing portion 2542 may have a shape corresponding to the rear surface of the fourth gasket corner portion 2341 and the seventh and the eighth connecting portions 2342 and 2343 of the gasket 2300. The front surface of the fourth reinforcing portion 2542 and the rear surface of the fourth gasket corner portion 2341 of the gasket 2300 and the rear surfaces of the seventh and the eighth link portions 2342 and 2343 can be in contact with each other, respectively. As a result, the front surface of the fourth corner sidewall 2541 can also be in contact with the rear surface of the gasket 2300 to support the gasket 2300.

The front portion of the fourth rib 2580 can be accommodated in the fourth rib groove 2224. The rear portion of the fourth rib 2580 is not accommodated in the fourth rib groove 2224 and can be exposed to the outside. The inner side surface of the fourth rib 2580 may be curved or bent so as to correspond to the outer side surface of the fourth gasket corner portion 2341 of the gasket 2300. Therefore, the inner side surface of the fourth rib 2580 can be in contact with the fourth gasket corner portion 2341. The fourth gasket corner portion 2341 can be covered by the rear portion of the fourth rib 2580. As a result, the fourth gasket corner portion 2341 may not be exposed to the outside.

The front portions of the first, the second, the third, and the fourth ribs 2550, 2560, 2570, and 2580 may be accommodated in the first, the second, the third, and the fourth rib grooves 2221, 2222, 2223, and 2224. The front body 2200 comprises a laser-transmissible plastic material, and the rear body 2500 may comprise a laser-absorbing plastic material. Therefore, when the laser beam is irradiated from the front of the front body 2200 towards the rear, the front portions of the first, the second, the third, and the fourth ribs 2550, 2560, 2570, and 2580 and the first, the second, the third, and the fourth rib grooves 2221, 2222, 2223, and 2224 can be thermally bonded. The front body 2200 and the rear body 2500 can be combined by such partial thermal bonding.

The portions irradiated with the laser beams in the first, the second, the third and the fourth ribs 2550, 2560, 2570, and 2580 may be the front surfaces of the first, the second, the third, and the fourth ribs 2550, 2560, 2570, and 2580. Further, it may be a widthwise center point on the front surface of the first, the second, the third, and the fourth ribs 2550, 2560, 2570, and 2580. On the other hand, the heat generated in the first, the second, the third, and the fourth ribs 2550, 2560, 2570, and 2580 during the laser welding process may be transferred to the neighboring gasket 2300. The gasket 2300 is made of an elastic rubber material and has poor heat resistance. As a result, there may be a problem in that the gasket 2300 is damaged by deterioration, and the sealing property is degraded. In order to solve such a problem, in the second embodiment, the shortest distance between the surface of the gasket 2300 and the portions of the first, the second, the third, and the fourth ribs 2550, 2560, 2570, and 2580 where the laser is irradiated may be 2 mm or more. That is, the forward distances from the first, the second, the third, and the fourth ribs 2550, 2560, 2570, and 2580 are secured to prevent the gasket 2300 from being damaged by deterioration.

The connector accommodating portion 2592 can be located on the rear surface of the rear body 2500. The connector accommodating portion 2592 may be in the form of a hollow rectangular parallelepiped rearwardly extending from the rear surface of the rear body 2500. The connector accommodating portion 2592 may accommodate the connector 2470 to protect from an external force.

Hereinafter, effects of the camera module 2000 of the present embodiment will be described. Since the front body 2200 and the rear body 2500 of the camera module 2000 of the present embodiment are combined by thermal bonding, the inner space 2590 of the rear body 2500 can be more widely secured when compared with a general camera module 2000 that is screw-combined.

Further, by applying the partial thermal bonding scheme through partial arrangement of the first, the second, the third, and the fourth ribs 2550, 2560, 2570, and 2580, the wider inner space 2590 of the rear body 2500 can be secured. Furthermore, airtightness (waterproof) and durability can be secured through the arrangement of the gasket 2300 and the first, the second, the third, and the fourth ribs 2550, 2560, 2570, and 2580.

More specifically, the first, the second, the third, and the fourth ribs 2550, 2560, 2570, and 2580 of the second embodiment may be partially disposed at the front surfaces of the first, the second, the third and the fourth corner sidewalls 2511, 2521, 2531, and 2541. On the contrary, the integrated rib R of the comparative example is disposed in the shape of a rectangular along the front surface of the sidewall portion. Therefore, the rear body 2500 of the second embodiment can secure an additional space S located inside the first, the second, the third, and the fourth sidewalls 2510, 2520, 2530, and 2540. Therefore, the camera module 2000 of the second embodiment can provide a wide internal space in which the board unit 2400 can be installed.

Further, in the second embodiment, the gasket 2300 is disposed between the front body 2200 and the rear body 2500. In this case, the front surface of the gasket 2300 can be in contact with the rear surface of the flange portion 2220 of the front body 2200. The rear surface of the gasket 2300 can be in contact with the front surface of the sidewall of the rear body 2500. As a result, the gasket 2300 is compressed by the combining pressure of the front body 2200 and the rear body 2500 to improve airtightness (waterproofness).

In addition, the first, the second, the third, and the fourth corner portions 2311, 2321, 2331, and 2341 of the gasket 2300 may be disposed inside the first, the second, the third, and the fourth ribs 2550, 2560, 2570, and 2580. In this case, the outer side surfaces of the first, the second, the third, and the fourth corner portions 2311, 2321, 2331, and 2341 are in contact with the inner side surfaces of the first, the second, the third, and the fourth ribs 2550, 2560, 2570, and 2580. Accordingly, the first, the second, the third, and the fourth corner portions 2311, 2321, 2331, and 2341 are covered by the first, the second, the third, and the fourth ribs 2550, 2560, 2570, and 2580 so that they may not be exposed to the outside. In the gasket 2300, the first, the second, the third, and the fourth corner portions 2311, 2321, 2331, and 2341 may be abraded as a portion where friction due to external force easily tends to occur, so it needs attention. In the camera module 2000 of the second embodiment, the first, the second, the third, and the fourth corner portions 2311, 2321, 2331, and 2341 which are vulnerable to an external force are covered by the first, the second, the third, and the fourth ribs 2550, 2560, 2570, and 2580 so that the loss of the gasket 2300 is minimized.

The first, the second, the third, and the fourth ribs 2550, 2560, 2570, and 2580 to which the laser welding is performed are disposed on the first, the second, the third and the fourth corner sidewalls 2511, 2521, 2531, and 2541 of the rear body 2500, so that the four corner side portions of the front body 2200 and the rear body 2500 are tightly coupled. As a result, the front body 2200 may not be easily separated from the rear body 2500. More specifically, due to the thermal bonding between the first, the second, the third, and the fourth ribs 2550, 2560, 2570, and 2580 disposed on the first, the second, the third and the fourth corner sidewalls 2511, 2521, 2531, and 2541 of the rear body 2500, and the first, the second, the third, and the fourth rib grooves 2221, 2222, 2223, and 2224 disposed on the flange portion 2220 of the front body 2200, the entire front surface of the first, the second, the third, and the fourth sidewalls 2510, 2520, 2530, and 2540 and the flange portion 2220 of the front body 2200 receives a combining force in a direction in which the front body 2200 and the rear body 2500 are combined. As a result, the durability of the camera module 2000 is enhanced.

In the above, to have been described as all the components that make up the embodiments of the present invention may operate in combination, or combined into one, but the invention is not necessarily limited to these examples. That is, if the object in the scope of the present invention, may be that all of the components are selectively operates in conjunction with more than one. In addition, terms such as "inclusive and", "is configured" or "have" described above is because, which means that unless there is a particular of stated that, the component can be embedded, except for the different components it should not be construed to further include other components. All terms, including technical and scientific terms, have the same meaning as commonly understood by one of ordinary skill in the art to which this invention belongs, unless otherwise defined. Commonly used terms, such as predefined terms, should be interpreted to be consistent with the contextual meanings of the related art, and are not to be construed as ideal or excessively formalistic, unless expressly defined to the contrary.

The above description is only to those described as the technical idea of the present invention by way of example, those skilled in the art that various modifications, additions and substitutions will be possible without departing from the essential characteristics of the present invention. Accordingly, the disclosed invention embodiments is for illustrative and not intended to limit the technical idea of the present invention, not by such an embodiment is the technical scope of the present invention is not limited. The scope of protection of the invention is to be interpreted by the following claims, all spirits within a scope equivalent will be construed as included in the scope of the present invention.

What is claimed:

1. A camera module comprising:
    a front body comprising:
        a lens barrel accommodating portion;
        a planar portion comprising a planar surface extending from the lens barrel accommodating portion in an outer circumferential direction; and
        a flange portion extending downward from the planar portion;
    a lens barrel disposed in the front body;
    at least one lens disposed in the lens barrel;
    a rear body coupled to the front body; and
    a substrate portion disposed in the rear body, and disposed below the lens barrel,
    wherein the planar portion comprises a thermal bonding groove formed on a lower surface of the planar portion,
    wherein the rear body comprises a thermal bonding portion protruding from an upper surface of the rear body, the thermal boding portion being disposed on and contacting the thermal bonding groove,
    wherein the thermal bonding portion overlaps with the at least one lens in a direction perpendicular to an optical axis direction,
    wherein the thermal bonding groove is spaced apart from an outer circumferential surface of the planar portion of the front body,
    wherein the planar portion comprises a first portion and a second portion formed on the lower surface of the planar portion,
    wherein the thermal bonding groove is disposed between the first portion and the second portion,
    wherein the first portion of the planar portion is disposed outside the second portion of the planar portion, and
    wherein a length of the second portion from a bottom surface of the thermal bonding groove in the optical axis direction is greater than a length of the first portion from the bottom surface of the thermal bonding groove in the optical axis direction.

2. The camera module according to claim 1, the camera module comprising a gasket disposed between the front body and the rear body,
    wherein the gasket is spaced apart from the thermal bonding portion.

3. The camera module according to claim 2, wherein the flange portion comprises an upper end, and a lower end disposed on an inner side of the upper end, and
    wherein the gasket covers the lower end of the flange portion.

4. The camera module according to claim 3, wherein the rear body comprises a gasket support portion protruding from an inner surface of the rear body, and
    wherein the gasket is pressed by the gasket support portion.

5. The camera module according to claim 4, wherein the gasket support portion overlaps with the upper end of the flange portion in the optical direction.

6. The camera module according to claim 5, wherein the gasket support portion is not overlapped with the lower end of the flange portion in the optical direction.

7. The camera module according to claim 5, wherein an upper surface of the gasket contacts with a lower surface of the upper end of the flange portion, a lower surface of the gasket contacts with an upper surface of the gasket support portion.

8. The camera module according to claim 7, wherein a side surface of the gasket is disposed adjacent to an inner surface of the rear body and a side surface of the lower end of the flange portion.

9. The camera module according to claim 3, wherein the thermal bonding groove of the planar portion is disposed outside the flange portion.

10. The camera module according to claim 3, wherein a width of the thermal bonding groove is wider than a width of the thermal bonding portion.

11. The camera module according to claim 10, wherein an upper surface of the thermal bonding portion contacts with an inner surface of the thermal bonding groove.

12. The camera module according to claim 11, wherein the thermal bonding portion is thermal bonded to the thermal bonding groove by laser welding, and
    wherein the shortest distance between a surface of the gasket and a laser irradiating portion irradiated with a laser in the thermal bonding portion is 2 mm or more.

13. The camera module according to claim 12, wherein the laser is irradiated from an upper side of the planar portion of the front body.

14. The camera module according to claim 13, wherein the front body and the rear body comprise a plastic material mixed with carbon or metal.

15. The camera module according to claim 2, wherein the gasket is a closed loop and made of a rubber material.

16. The camera module according to claim 1, wherein the lens barrel accommodating portion, the planar portion, and the flange portion are formed integrally.

17. The camera module according to claim 1, wherein at least one portion of the front body is disposed in the rear body.

18. A camera module manufacturing method comprising the steps of:
    combining a front body and a gasket;
    accommodating a substrate portion in a rear body;
    aligning the front body and the rear body in close contact with each other; and
    thermal bonding of the front body and the rear body to manufacture a camera module,
    wherein the camera module comprises:
        the front body comprising:
            a lens barrel accommodating portion;

a planar portion comprising a planar surface extending from the lens barrel accommodating portion in an outer circumferential direction; and a flange portion extending downward from the planar portion;

a lens barrel disposed in the front body;

at least one lens disposed in the lens barrel;

the rear body coupled to the front body; and the substrate portion disposed in the rear body, and disposed below the lens barrel, wherein the planar portion comprises a thermal bonding groove formed in a bottom surface of the planar portion, wherein the rear body comprises a thermal bonding portion protruding from an upper surface of the rear body, the thermal bonding portion being disposed on and contacting the thermal bonding groove, wherein the thermal bonding portion overlaps with the at least one lens in a direction perpendicular to an optical axis direction, wherein the thermal bonding groove is spaced apart from an outer circumferential surface of the planar portion of the front body, wherein the planar portion comprises a first portion and a second portion formed on the lower surface of the planar portion, wherein the thermal bonding groove is disposed between the first portion and the second portion, wherein the first portion of the planar portion is disposed outside the second portion of the planar portion, and wherein a length of the second portion from a bottom surface of the thermal bonding groove in the optical axis direction is greater than a length of the first portion from the bottom surface of the thermal bonding groove in the optical axis direction.

19. The camera module according to claim 1, wherein the substrate portion comprises a first substrate, a second substrate, and a third substrate, wherein the first substrate is spaced apart from the third substrate and connected to the third substrate by the second substrate.

* * * * *